United States Patent [19]
Gasper et al.

[11] Patent Number: 5,887,207
[45] Date of Patent: Mar. 23, 1999

[54] STILL PICTURE CAMERA WITH TWO FILM CASSETTES

[75] Inventors: John Gasper, Hilton; Daniel M. Pagano, Honeoye Falls, both of N.Y.

[73] Assignee: Eastman Kodak Company, Rochester, N.Y.

[21] Appl. No.: 25,686

[22] Filed: Feb. 18, 1998

[51] Int. Cl.$^6$ .............................. G03B 19/02; G03B 17/02
[52] U.S. Cl. .......................... 396/390; 396/446; 396/538
[58] Field of Search .................................... 396/390, 446, 396/2, 406, 407, 408, 409, 410, 418, 535, 538

[56] References Cited

U.S. PATENT DOCUMENTS

| | | |
|---|---|---|
| 2,439,112 | 4/1948 | Teague . |
| 2,507,926 | 5/1950 | Noble . |
| 2,616,342 | 11/1952 | Thompson . |
| 2,672,796 | 3/1954 | Incledon . |
| 3,034,412 | 5/1962 | Bohm et al. . |
| 3,805,277 | 4/1974 | Domnick . |
| 4,994,828 | 2/1991 | Smart . |
| 5,023,642 | 6/1991 | Pagano . |
| 5,209,419 | 5/1993 | Zander . |
| 5,231,438 | 7/1993 | Smart . |
| 5,258,789 | 11/1993 | Labaziewicz . |
| 5,357,301 | 10/1994 | Prosser . |
| 5,357,303 | 10/1994 | Wirt . |
| 5,552,848 | 9/1996 | Lawther . |
| 5,555,048 | 9/1996 | Oldfield . |
| 5,614,976 | 3/1997 | Smart et al. . |

*Primary Examiner*—David M. Gray
*Attorney, Agent, or Firm*—Thomas H. Close

[57] ABSTRACT

A still picture camera for capturing images when film is alternately advanced from either of two film cassettes into a common film gate for a controlled exposure by light passing through an objective lens and shutter, the camera comprising a camera body, an objective lens for forming an image, a shutter for controlled admission of light, a film gate for defining the area of exposure of one frame of photographic film, two film cassette chambers each accepting a film cassette, a film drive mechanism, and one film spooling chamber for alternately receiving film from either film cassette.

34 Claims, 30 Drawing Sheets

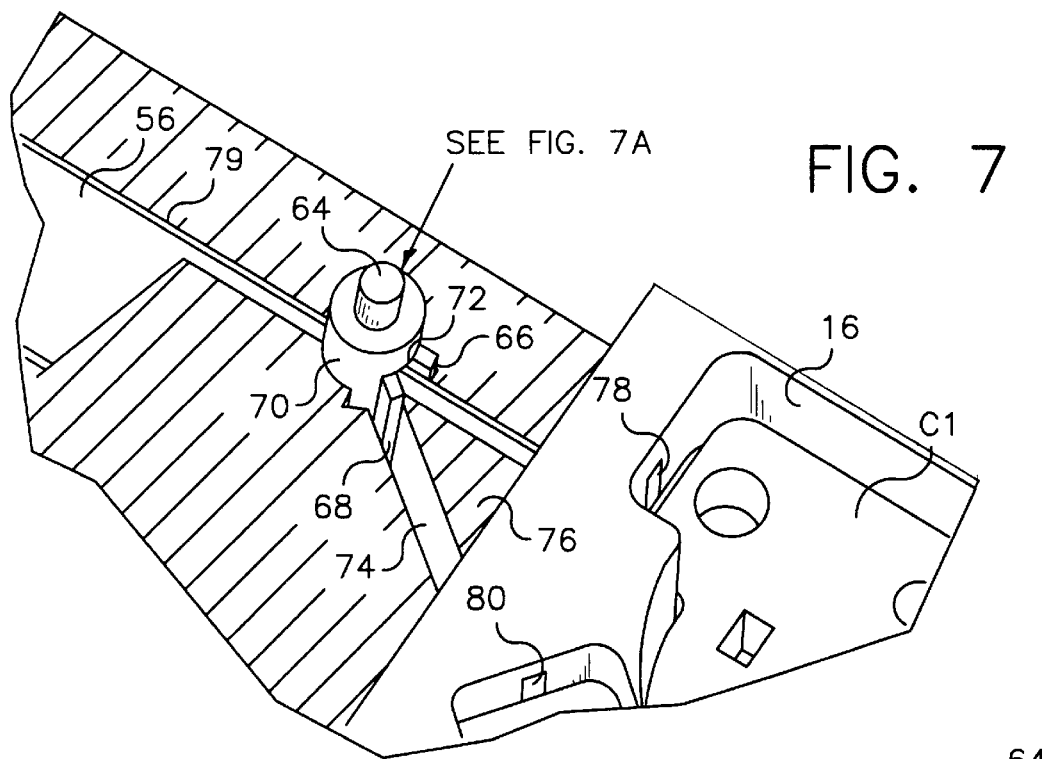
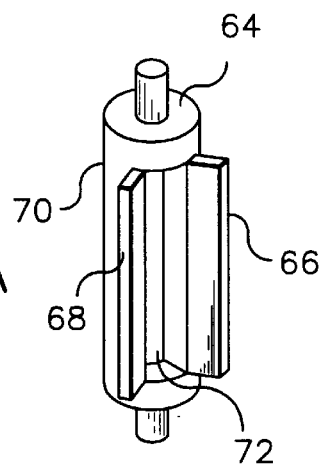
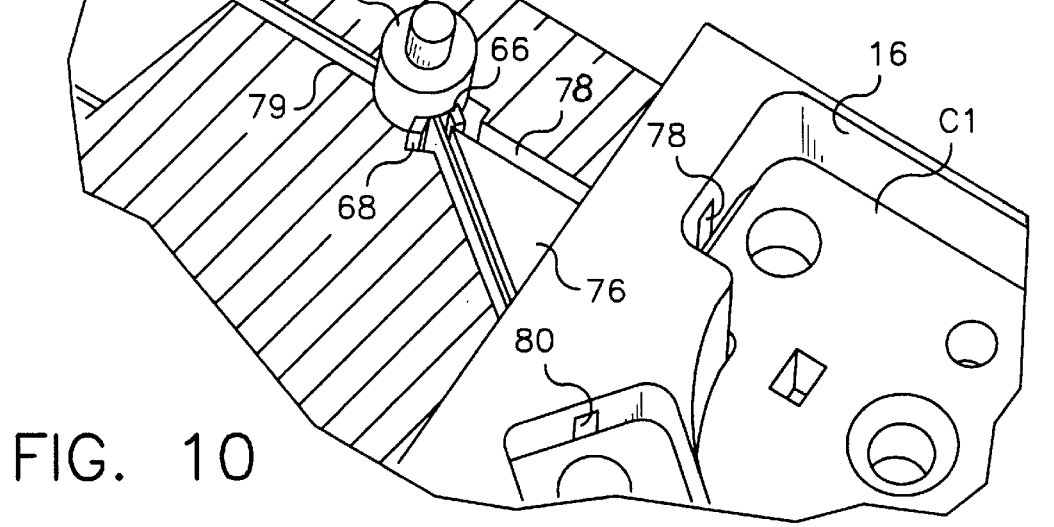

STILL PICTURE CAMERA WITH TWO FILM CASSETTES

CROSS-REFERENCE TO RELATED APPLICATIONS

The present application is related to U.S. Application Serial Number to be assigned, by Daniel M. Pagano and John Gasper, and entitled, "Still Picture Camera with Multiple Film Cassettes" (EK Docket 76,081).

FIELD OF THE INVENTION

The invention relates generally to the field of photography, and in particular to a still picture camera. More specifically, the invention relates to a camera that accepts two film cassettes, typically of different ISO film speeds.

BACKGROUND OF THE INVENTION

Photography, whether by the professional or amateur, is an art form wherein the photographer imparts his skills in selecting the subject, lighting, exposure, and choice of film. For example, the photographer may want a high speed black & white film for one subject but a slow, fine grain color film for another, or a color slide film and later a color-negative film, or more commonly a slow speed film to use under bright lighting conditions such as found outdoors and a high speed color-negative film for lower lighting conditions such as found indoors. It has therefore been necessary for the photographer to either carry two or more cameras each loaded with the appropriate film type or to use one camera loaded with different film types which requires unloading one film and replacing it with another. This is a time consuming process that at best delays the time of exposure by a few minutes or at worst causes a complete loss of the photo opportunity. Attempts have been made in the past to build cameras that accepted more than one roll or cassette of film. For example, U.S. Pat. Nos. 2,439,112, 2,616,342, 2,672,796, 3,034,412, 3,805,277 and 5,357,301 all describe cameras with a single objective lens but two pressure plates, supply spools, and take-up spools. Various methods, some rather complex, are described for changing exposure from one film supply to the other, such as by mechanical or optical means. U.S. Pat. No. 2,507,926 describes a camera with a single objective lens capable of exposing multiple films from multiple pressure plates, supply spools, and take-up spools.

Cameras currently being manufactured hold only one film cassette with a fixed number of exposures. In a new line of Advanced Photo System (APS) cameras the more expensive cameras have a feature called mid-roll interrupt. This feature allows the user to remove a film cassette prior to exposing all frames. When this same cassette is reinserted into the camera at a later time, the film is automatically thrust from the cassette and advanced into the film gate to expose the next unexposed frame. This operation requires that the camera have a magnetic read/write head. The APS film has a thin layer of a magnetic recording medium coated on the film base to which the magnetic head can read and write the necessary information that enables mid-roll interrupt. As the lighting conditions change or the photographer moves between indoor and outdoor photography, there is a need to take pictures with film having an ISO speed optimally matched to the changing lighting conditions. In order to expose film with an ISO speed different from that of the film in the camera, it is first necessary to rewind and remove the cassette presently in the camera and then load the camera with a cassette of different film speed. It is therefore necessary for the photographer to have available a second film cassette of the appropriate film speed at the moment when it is the preferred film to use. Most likely this second film cassette will not be available because people do not plan ahead and do not like to carry film in a pocket, purse, or camera bag. If the second cassette is not available at the required moment then the photo opportunity is either lost or the exposure is made with film of the incorrect speed, thereby producing a photographic print of non-optimal image quality. Even when another film cassette is available for this exchange, the amount of time required to perform the exchange is minutes rather than seconds by which time the photo-opportunity may be lost. Prints of non-optimal image quality are typically either grainy, too light or too dark, or lack proper contrast. The lower-cost cameras do not offer the mid-roll interrupt feature. After loading film into the lower-cost cameras, the cassette chamber door is locked and cannot be opened until all frames are exposed or the user elects to remove the film prior to exposing all frames, in which case the remaining frames can never be exposed.

There is a need therefore for an improved camera capable of capturing photographic images on more than one type of film.

SUMMARY OF THE INVENTION

The present invention is directed to overcoming one or more of the problems set forth above. Briefly summarized, according to one aspect of the present invention, a camera provides mid-roll interrupt by storing in two cassette chambers two film cassettes and selecting at any time the optimal film to advance into a single film gate from either of said two cassettes according to the lighting conditions without the need of a magnetic read/write head. Only one spooling chamber is required in which to spool the film as it is advanced through the film gate.

The present invention therefore provides a still picture camera for capturing images when film is alternately advanced from either of two film cassettes into a common film gate for a controlled exposure by light passing through an objective lens and shutter, the camera comprising a camera body, an objective lens for forming an image, a shutter for controlled admission of light, a film gate for defining the area of exposure of one frame of photographic film, two film cassette chambers each accepting a film cassette, a film drive mechanism, and one film spooling chamber for alternately receiving film from either film cassette.

Another object of the present invention is to provide two light tight and lockable single-chamber doors that enable removal from a first chamber of an exposed cassette and reloading the chamber with another cassette without requiring film currently in the film gate from a cassette in a second chamber to first be returned to its light-tight cassette.

Another object of the present invention is to provide a slit light lock to enable removal and reloading of a film cassette into one cassette chamber without exposing film that has been thrust into the film gate from a film cassette in the other chamber.

Yet another object of the present invention is to provide one light tight and lockable two-chamber door to enable removal of either or both film cassettes and reloading of either or both chambers with film cassettes.

Still another object of the present invention is to provide a central processing unit to control operation of the camera.

Yet another object of the present invention is to provide a still picture camera that provides a minimal number of film changes by judicious employment of electronic flash.

A further object of the present invention is to provide mid-roll interrupt in a camera that does not require a magnetic read/write head.

Another object of the present invention is to provide to the user a greater number of film exposures prior to reloading the camera.

Still another object of the present invention is to provide to the user a greater number of prints of superior image quality than offered by present APS cameras.

Yet another object of the present invention is to provide the photographer with greater number of picture taking opportunities.

Lastly, the camera of the present invention can be used with two film cassettes with each cassette having a minimum number of exposures without sacrificing total number of exposures and providing to the user the advantage of getting the film processed and printed sooner.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides to the photographer a compact and intelligent camera capable of automatically selecting and exposing film of the correct film speed over a much wider range of lighting conditions than heretofore possible. The quality of the photographic prints is greatly improved by avoiding situations of under-exposure and over-exposure that arise when the film loaded in the camera is of the wrong film speed for the lighting conditions. The camera of the present invention is also able to take more pictures before requiring reloading than cameras of the prior art as well as deliver prints to the customer in a more timely fashion.

BRIEF DESCRIPTION OF THE DRAWINGS

All drawings of one example of a camera of the present invention are perspective views unless specifically noted otherwise.

FIG. 7 is a blowup of the slit light lock of FIG. 6 showing film passing through a central slit from cassette 1;

FIG. 10 is a blowup of the slit light lock of FIG. 8 showing film passing through a central slit from cassette 2;

To facilitate understanding, identical reference numerals have been used, where possible, to designate identical elements that are common to the figures.

DETAILED DESCRIPTION OF THE INVENTION

Figure 1:
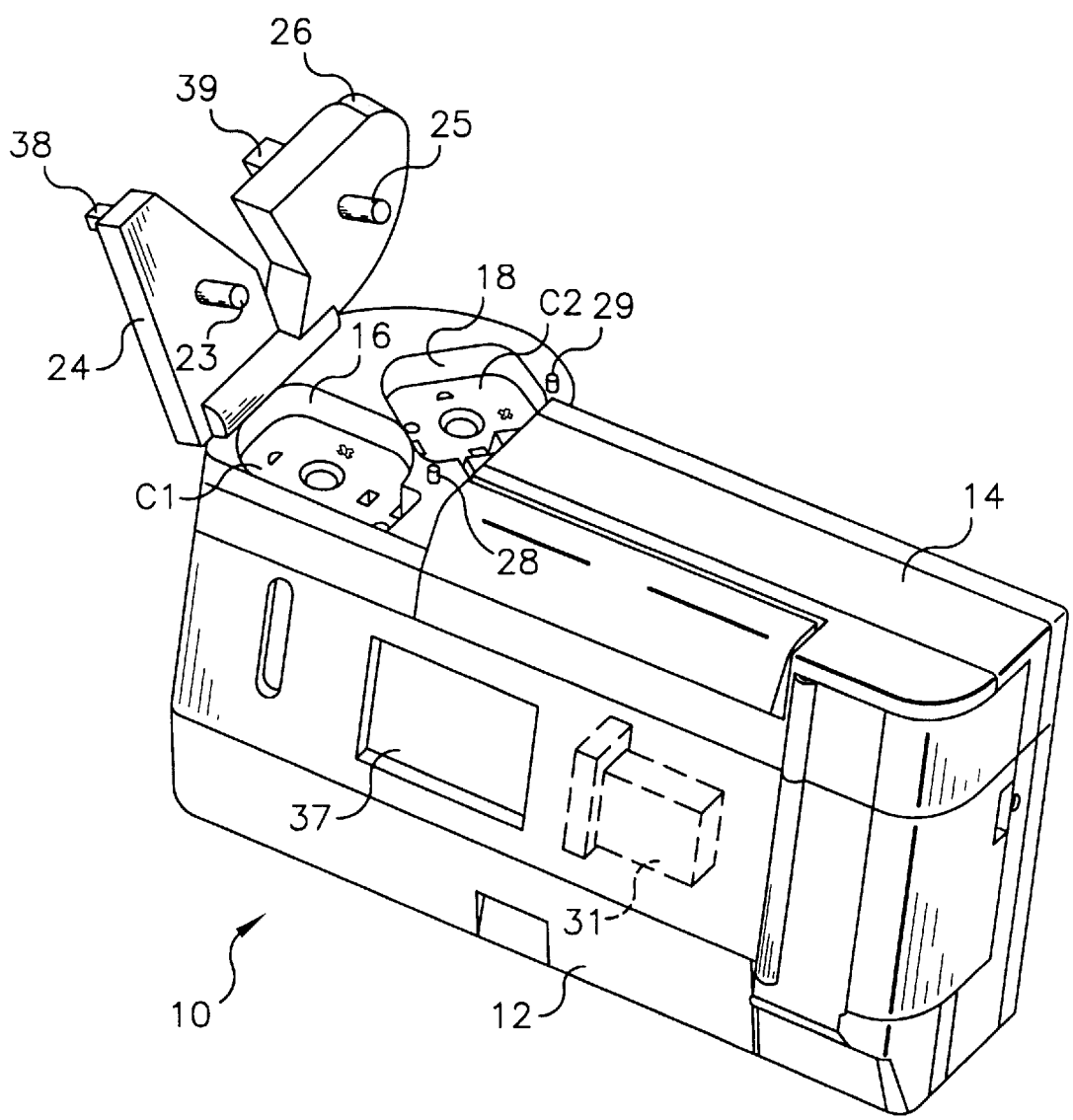
FIG. 1 shows the back and underside of a camera with two cassettes loaded in two cassette chambers. The camera has two doors for individually loading the film cassettes.
Figure 2:
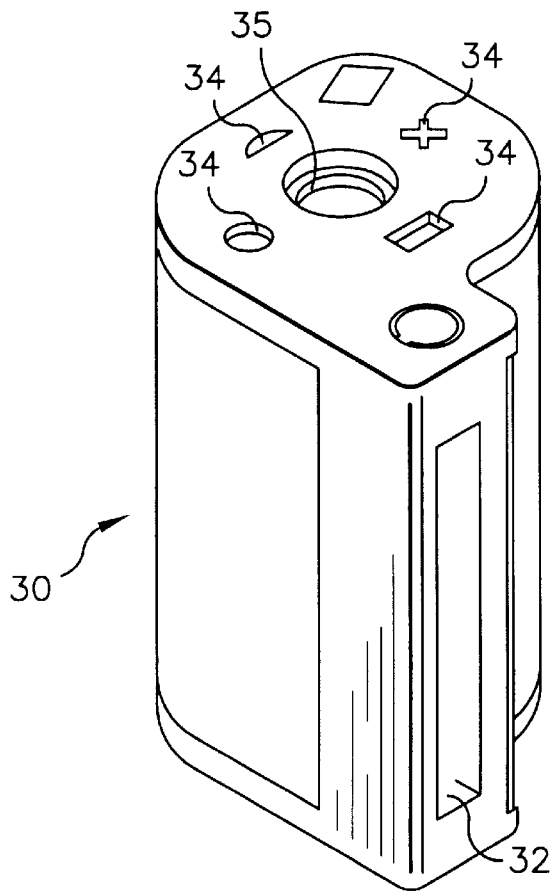
FIG. 2 is a perspective view showing one end and sides of a film cassette.
Figure 3:
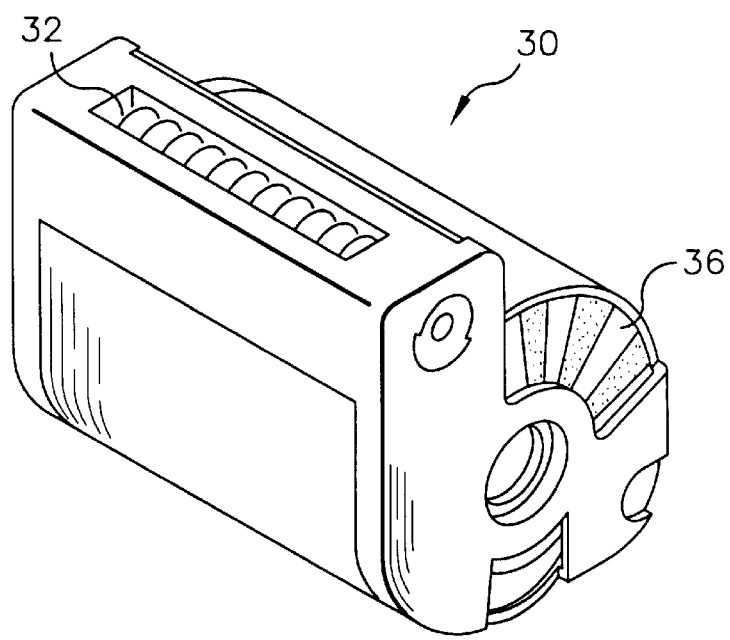
FIG. 3 is a perspective view showing other end and sides of a film cassette.

A still picture camera 10 of the present invention is shown in perspective view in FIG. 1. The figure shows the back 12 and underside 14 of the camera. More specifically the figure shows the camera 10 has two cassette chambers, designated as cassette C1 in chamber 16 and cassette C2 in chamber 18, each loaded, respectively, with a film cassette C1 and cassette C2 of the thrust type by means of a separately operable light tight and lockable chamber door 24 and chamber door 26. Attached to the inside of each door is a spool centering pin (23 and 25) aligned to engage with and center the cartridge spools 35 (FIG. 2) when the doors are closed. After loading a film cassette into a cassette chamber and closing the chamber door, the chamber door is locked and will not open until the film in the cassette is completely exposed or the chamber door lock 38 is manually overridden. Also, after loading a film cassette 30 shown in perspective view in FIGS. 2 and 3 into a cassette chamber and closing the chamber door, a microprocessor or central processing unit (CPU) 31 (shown in phantom) initiates the opening of active light lock (A.L.L.) door 32 in the cassette 30 and the reading of data disk 36 (see FIG. 3) to record in the CPU the ISO film speed and number of frames provided for exposure. A pair of light lock door drivers 41 and 43 (FIG. 5) are provided in the camera, and are under the control of CPU 31. A pair of door open/close sensors 28 and 29 are provided for detecting when the chamber doors 24 and 26 are open or closed. The output of the sensors is supplied to the CPU 31. Each of the chamber doors 24 and 26 is provided with a door lock 38 and 39 respectively that can be manually actuated to open the doors. However, the manual actuation of the door locks can be prevented by the CPU if film has not been rewound into a cassette and the light lock door on the cassette has not been closed. The status of film exposure can be viewed prior to using the cassette by looking at the film status indicators 34 at one end of the cassette. The camera also has a visual display such as a liquid crystal display (LCD) 37 to show the user the present status of the film cassettes loaded into the chambers.

Further details of the operation of APS cameras and cassettes are provided, respectively, in selected U.S. Pat. Nos. 4,994,828; 5,023,642; 5,231,438; 5,552,848 and 5,555,048 and selected U.S. Pat. Nos. 5,209,419; 5,258,789; 5,357,303 and 5,614,976 and these details will not be discussed here.

Figure 4:
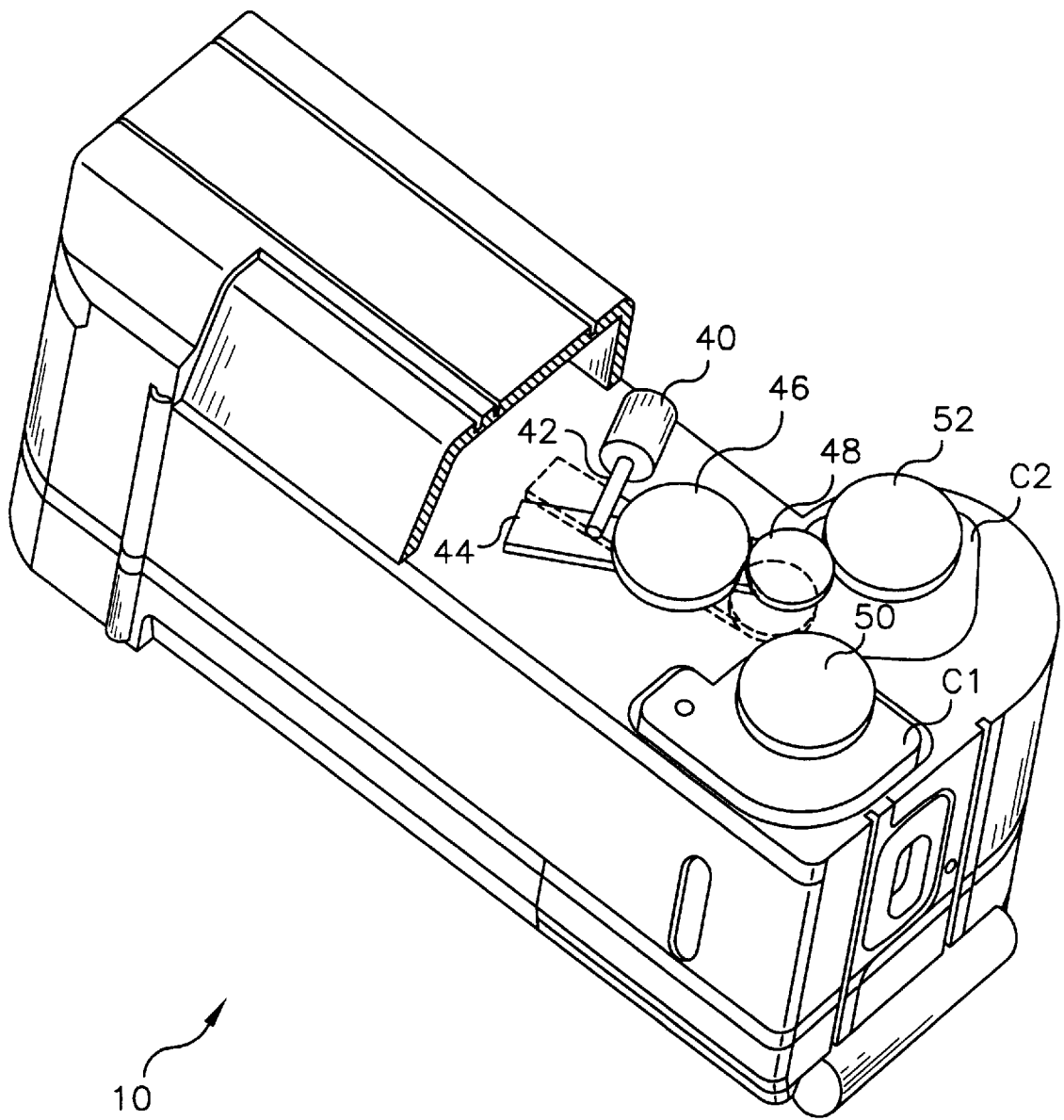
FIG. 4 shows the back and topside of a camera with two cassettes loaded in two cassette chambers. A cutaway shows details of the solenoid actuated gear drive train for thrusting film from and rewinding film into one cassette and in phantom a second position of the gear drive train for thrusting film from and rewinding film into a second film cassette.

In FIG. 4 is shown a cutaway view of one method of thrusting film from either cassette C1 or C2 into the film gate for exposure. A bidirectional direct current (DC) latching solenoid 40 has its piston 42 connected to a pivot arm 44. As shown in phantom the solenoid is actuated with a momentary positive or negative voltage pulse to pivot the arm 44 so as to change the engagement of the gear drive train (attached to arm 44) composed of gear 46 and gear 48 from spool drive gear 52, designated as "position 2" shown in solid lines in FIG. 4, to spool drive gear 50, designated as "position 1" and shown in phantom in FIG. 4. Position 1 is also specified as the default position for a microprocessor or CPU that governs control of the camera's operation. The center of rotation of pivot arm 44 is at the center of gear 46.

Figure 5:
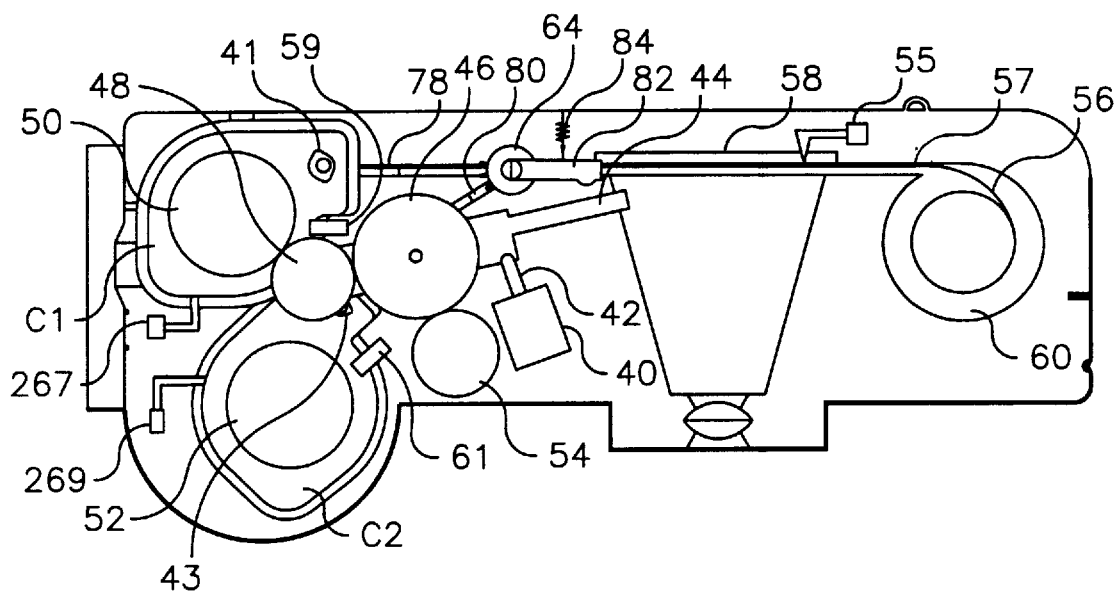
FIG. 5 is a plan, cut-away view of a slit light lock, gear drive train, and film path for one position of a DC pulse-actuated latching solenoid.

FIG. 5 shows a cut-away of the top of the camera in plan view with additional components. Piston 42 of the latching solenoid 40 is connected to pivot arm 44. Gears 46 and 48 are mounted to pivot arm 44 and motor-driven gear 54 is engaged to drive gears 46 and 48. Spool drive gear 50 is an integral part of the spool driver (not shown) for cassette C1 and spool drive gear 52 is an integral part of the spool driver (also not shown) for cassette C2. Arm 82 is an integral part of slit light lock (S.L.L.) 64. Arm 82 is urged into the clockwise direction by compression spring 84 trying to expand to allow the slit light lock 64 to align with film channel 78. FIG. 5 also shows the path of film 56 thrust from cassette C1, through film channel 78, slit light lock 64, film gate 58, film channel 57, to be spooled in spooling chamber 60. This is the default position 1 for engaging spool drive gear 50 and aligning the central slit 72 (see FIG. 7) in the slit light lock 64 to film channel 78. After engagement of gear 48 to spool drive gear 50, motor-driven gear 54 can subsequently thrust film 56 from cassette C1 into the film gate 58. The same motor (not shown) driving gear 54 is also capable of running in reverse to rewind film back into cassette C1. Inside the camera is a film perforation sensor 55 that is connected to the CPU 31. The film perforation sensor enables the CPU 31 to calculate the number of the current frame in the film gate 58 by counting the number of perforations (frames) that pass the sensor. The microprocessor is then able to keep track of which frames have been exposed and which frame was exposed last. By using a perforation sensor 55, the number of exposed frames in a cassette can be tracked by the CPU without the need for a magnetic read/write head. A pair of data disk readers, 59 and 61 are provided in chambers 16 and 18 respectively to read the data disks 36 on the cassettes.

Figure 6:
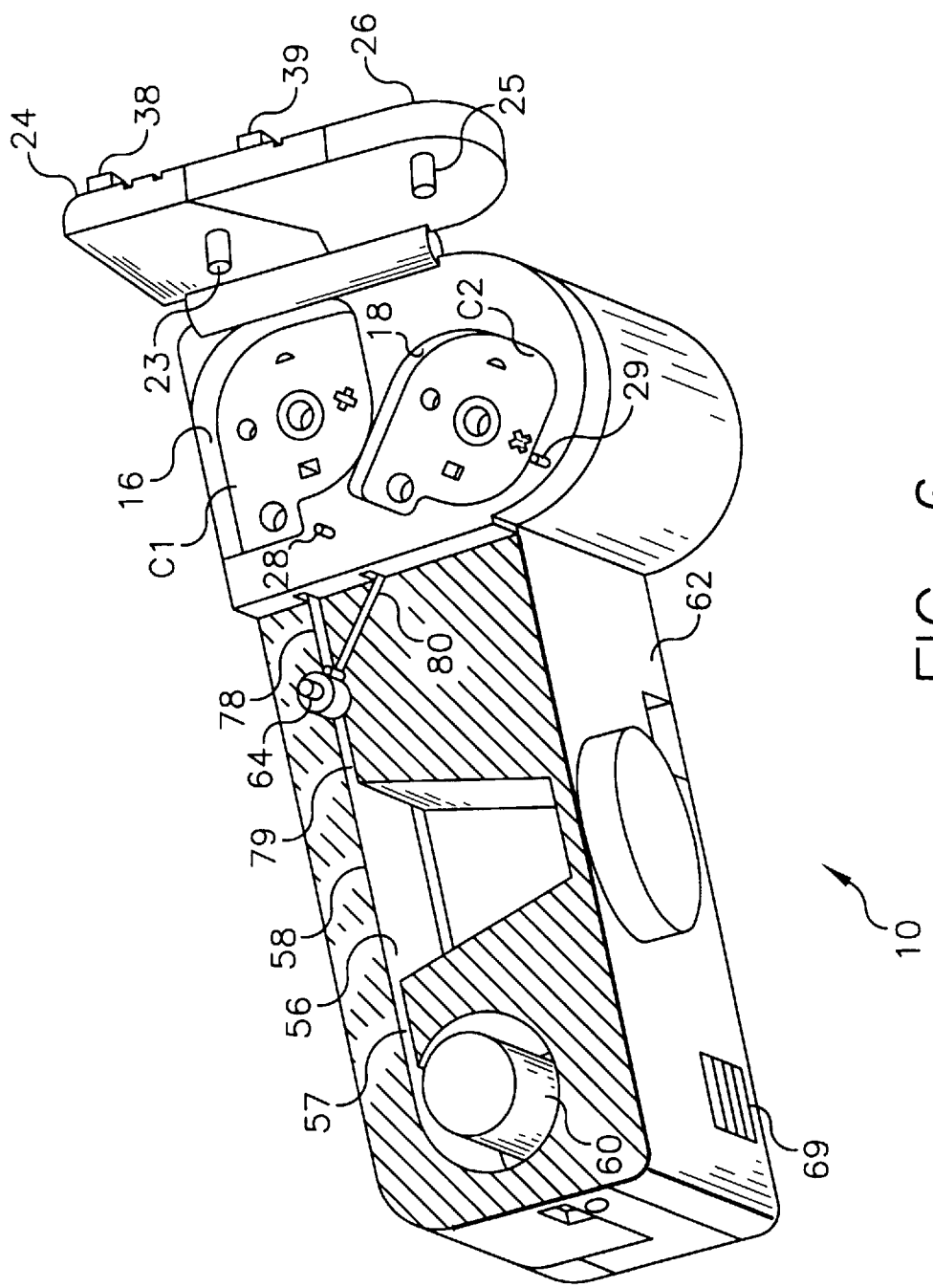
FIG. 6 shows the front and underside of a camera with two singlechamber doors for loading two cassettes loaded in two cassette chambers. A cutaway shows details of the path of film from cassette 1 to the film gate and spooling chamber and the position of a slit light lock.

FIG. 6 is a perspective view of the front 62 of the camera of the present invention and the underside of the camera showing two cassettes C1 and C2 loaded into cassette chambers 16 and 18, respectively, and a cut-away of a portion of the underside of the camera. Film 56 has been thrust from cassette C1 in chamber 16 into film channel 78, through slit light lock 64, film channel 79, film gate 58, film channel 57, and spooling chamber 60. The cut-away shows details of the path of the film from cassette C1 to the film gate 58 and the slit light lock 64 in the default position 1. The purpose of slit light lock 64 is to prevent light from exposing film extending from cassette C1 when chamber door 26 is opened to remove or replace cassette C2 after it is totally exposed. The camera 10 may include an electronic flash 69 that is under the control of the microprocessor 31.

FIG. 7 provides a magnified view of the slit light lock 64 in position 1. Two light baffles 66 and 68 extend out from the wall 70 of the cylindrically-shaped slit light lock 64. The light baffles 66,68 are positioned along both sides of a central slit 72 for the full length of the slit pathway through the slit light lock 64. In the position shown, light baffle 68 has been urged by compression spring 84 to rest against wall 74 of triangular-shaped rib 76 to block any light from exposing film loaded into the film gate from cassette C1 when chamber door 26 is opened. In this figure film 56 passes from cassette C1 through film channel 78 before reaching the slit light lock 64.

Figure 8:
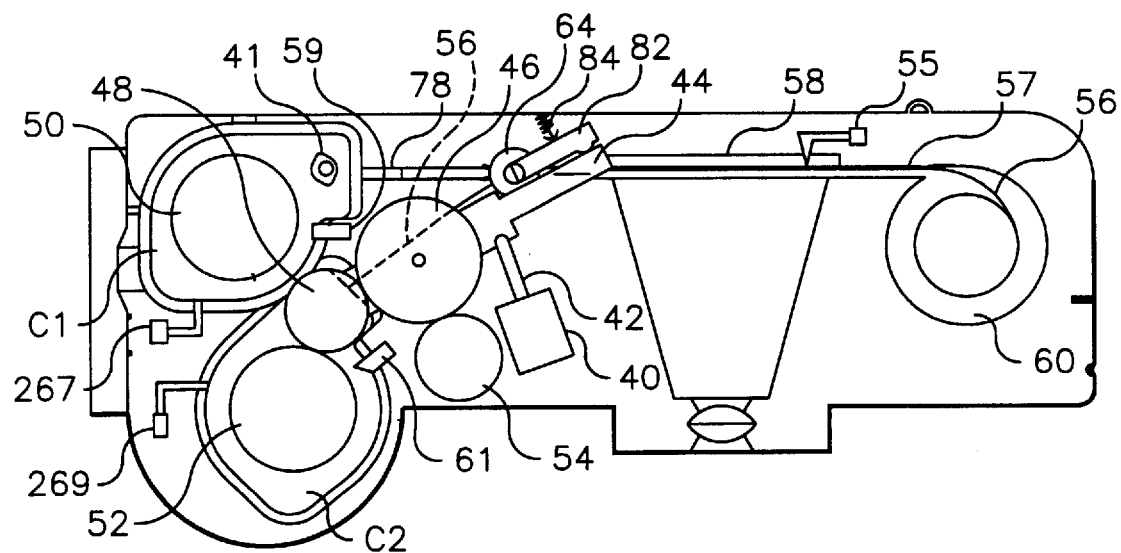
FIG. 8 is a plan, cut-away view of a slit light lock, gear drive train, and film path for a second position of a DC pulse-actuated latching solenoid.

FIG. 8 shows in plan view a cut-away of the top of the camera. Latching solenoid 40 has received a DC voltage pulse that causes piston 42 to extend and push arm 44 against arm 82, causing arm 82 to further compress spring 84 and align slit light lock 64 with film channel 80 (see FIG. 9).

Simultaneously activation of solenoid 40 has caused the engagement of gear 48 to spool drive gear 52, motor-driven gear 54 can subsequently thrust film 56 from cassette C2 into the film gate 58. The same motor (not shown) driving gear 54 is also capable of running in reverse to rewind film back into cassette C2. FIG. 8 also shows in phantom the path of film 56 thrust from cassette C2, through film channel 80, slit light lock 64, film channel 79, film gate 58, and film channel 57 to be spooled in spooling chamber 60.

Figure 9:
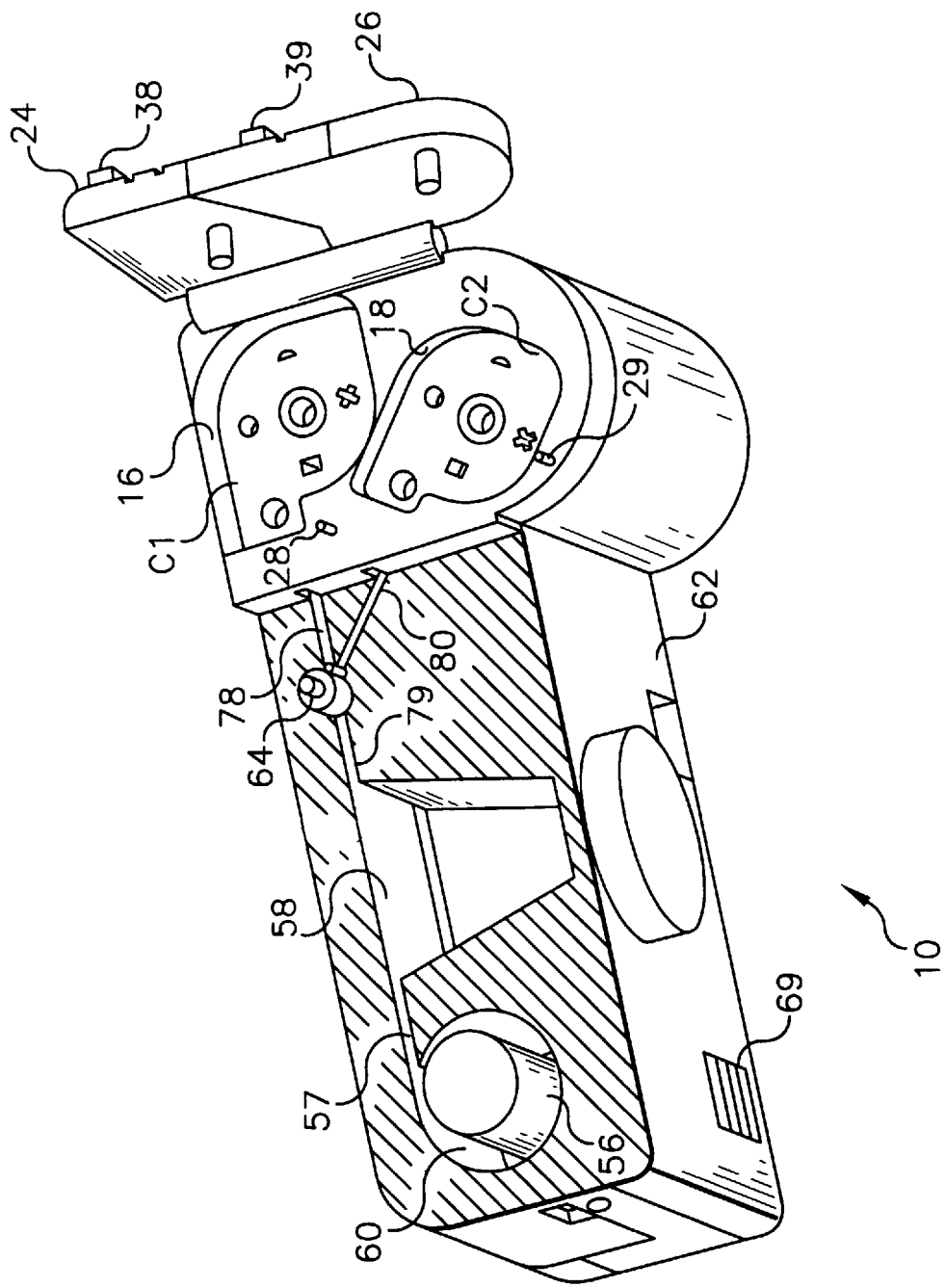
FIG. 9 shows the front and underside of a camera with two cassettes loaded in two cassette chambers. A cutaway shows details of the path of film from cassette 2 to the film gate and spooling chamber and the position of a slit light lock.

FIG. 9 is perspective view of the front 62 and underside of a camera with two cassettes loaded in two cassette chambers. Film 56 has been thrust from cassette C2 into the film gate 58 and the spooling chamber 60. A cutaway shows details of the path of the film from cassette C2 to the film gate and the position of the slit light lock 64. The slit light lock 64 has now been driven by solenoid 40 into position 2 and prevents light from exposing film extending from cassette C2 when chamber door 24 is opened to remove or replace cassette C1 after it is totally exposed.

FIG. 10 provides a magnified view of the slit light lock 64 in position 2. In the position shown, light baffle 66 has been urged (by pivot arm 44 pushing against arm 82 in FIG. 8) to rest against wall 75 of rib 76 to block any light from exposing film 56 loaded into the film gate 58 from cassette C2. In this figure film 56 passes from cassette C2 through film channel 80 before reaching the slit light lock 64.

Figure 11:
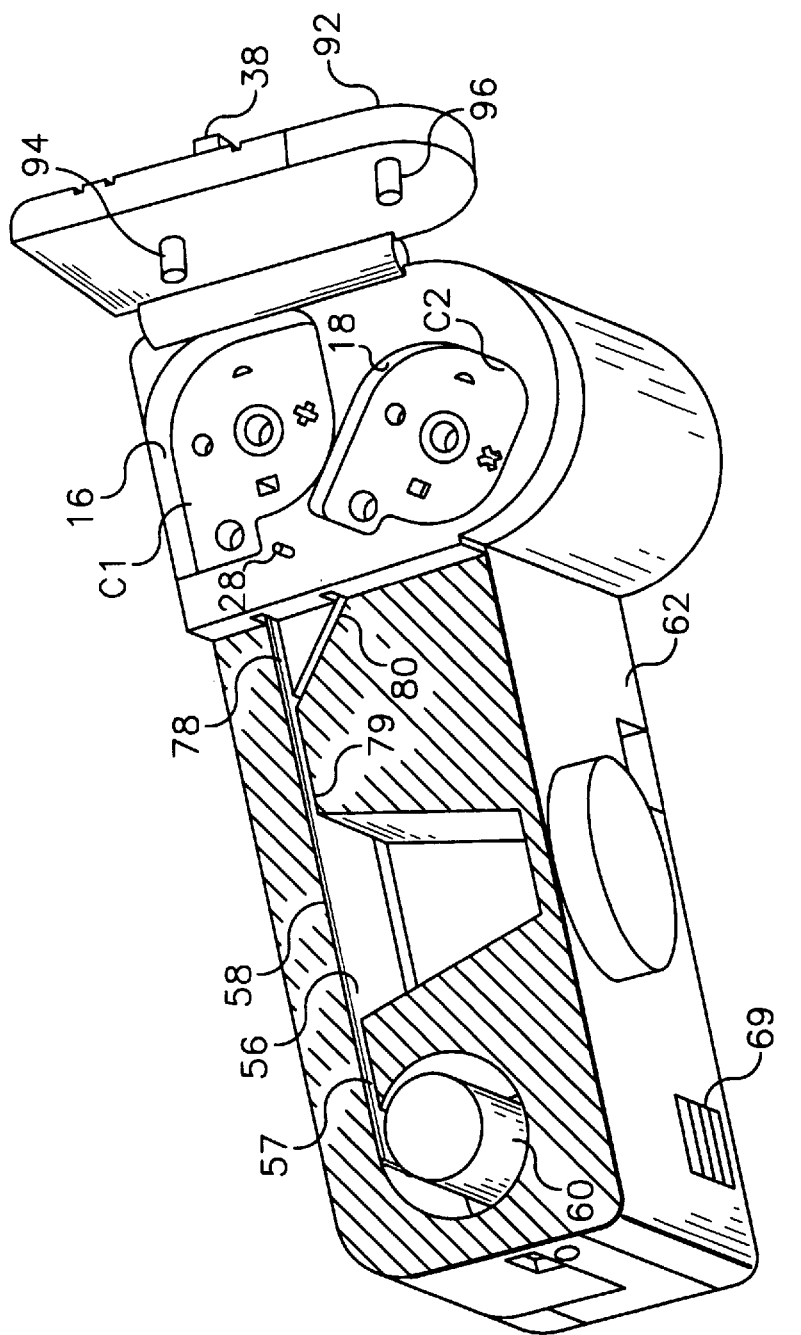
FIG. 11 shows the front and underside of a camera with one twochamber door for loading two cassettes in two cassette chambers. A cutaway shows details of the path of film from cassette 1 to the film gate and spooling chamber.

Yet another embodiment of the invention is a camera that employs only one light tight and lockable two-chamber door for loading both chambers with film as shown in FIG. 11. Attached to the inside of the two-chamber door 92 are two spool centering pins 94 and 96 aligned to engage with and center the spools when the door is closed. The design of this camera is simplified because it does not have a slit light lock. Any film that has been thrust into the film gate for exposure must first be rewound into its cassette and the A.L.L. door closed prior to opening the two-chamber door to prevent film exposure from ambient light. The driver for film thrusting and rewinding and the mechanism for switching the driver from one cassette to the other is the same except for the absence of the slit light lock. Film channels 78 and 80 converge to channel 79 to direct film thrust from either cassette to the film gate 58, from whence the film proceeds via film channel 57 to the spooling chamber 60. This camera also has a visual display such as a an LCD to show the user the present status of the film cassettes loaded into the chambers.

One example of the operation of camera 10 having two singlechamber doors and a slit light lock will now be described with reference to the Flow Chart 1 in FIG. 12. The operation of the camera in this example is governed by a microprocessor programmed with the priority that electronic flash be used as seldom as possible. If lighting conditions change such that the current film in the gate would require use of electronic flash, but the film in the other cassette is of greater ISO speed and may or may not require electronic flash, then the film change is made automatically. Many aspects of the operation of an actual camera are not included in this flow chart as they are not relevant to describing the invention.

Figure 12:
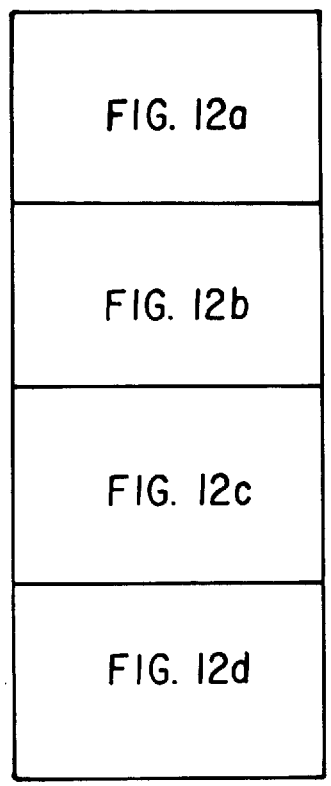
FIG. 12 is a typical flow chart for the basic operation of a camera having two single-chamber doors where the priority of operation is to minimize use of the camera's electronic flash.
Figure 12A:
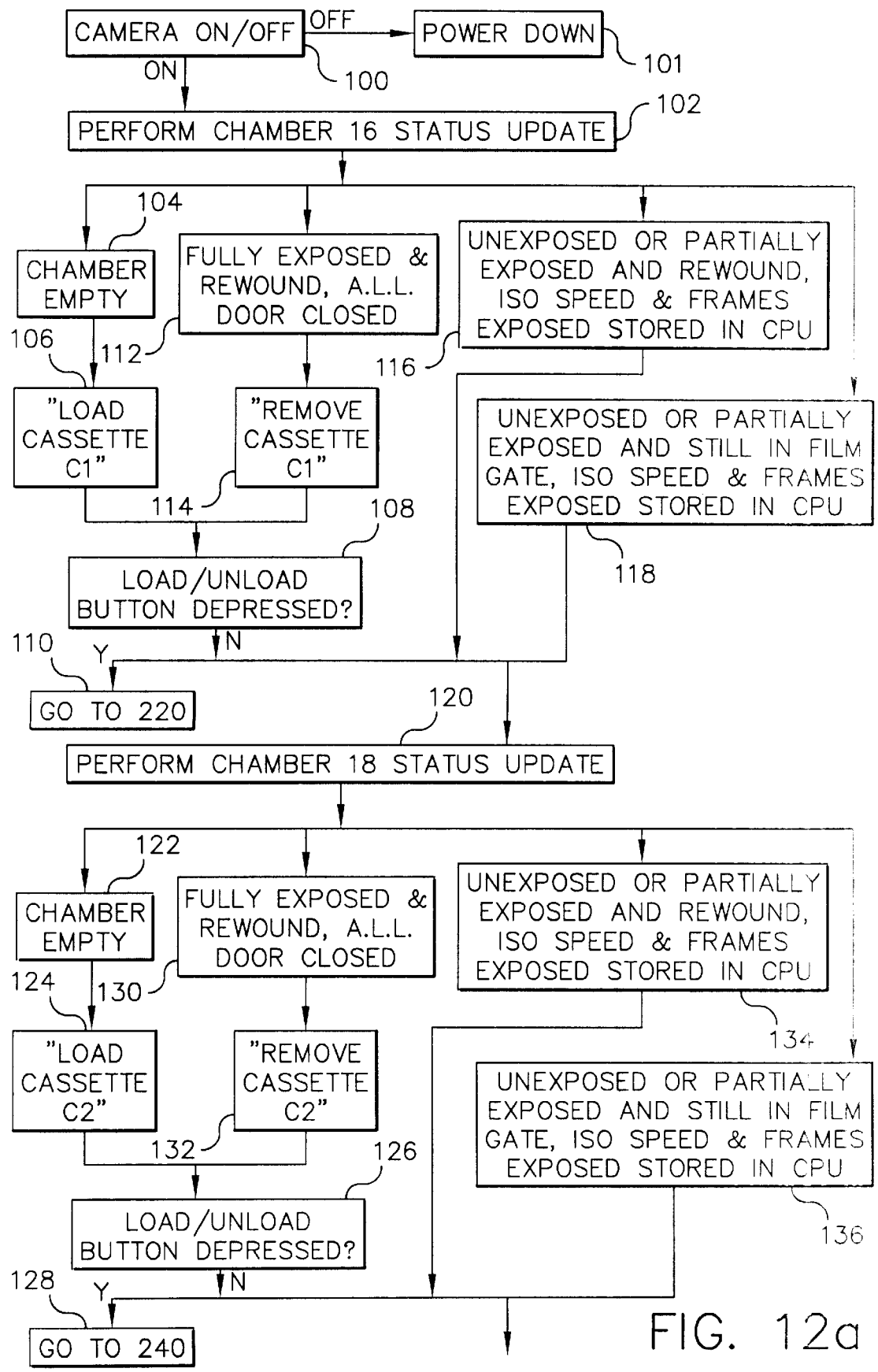
Figure 12B:
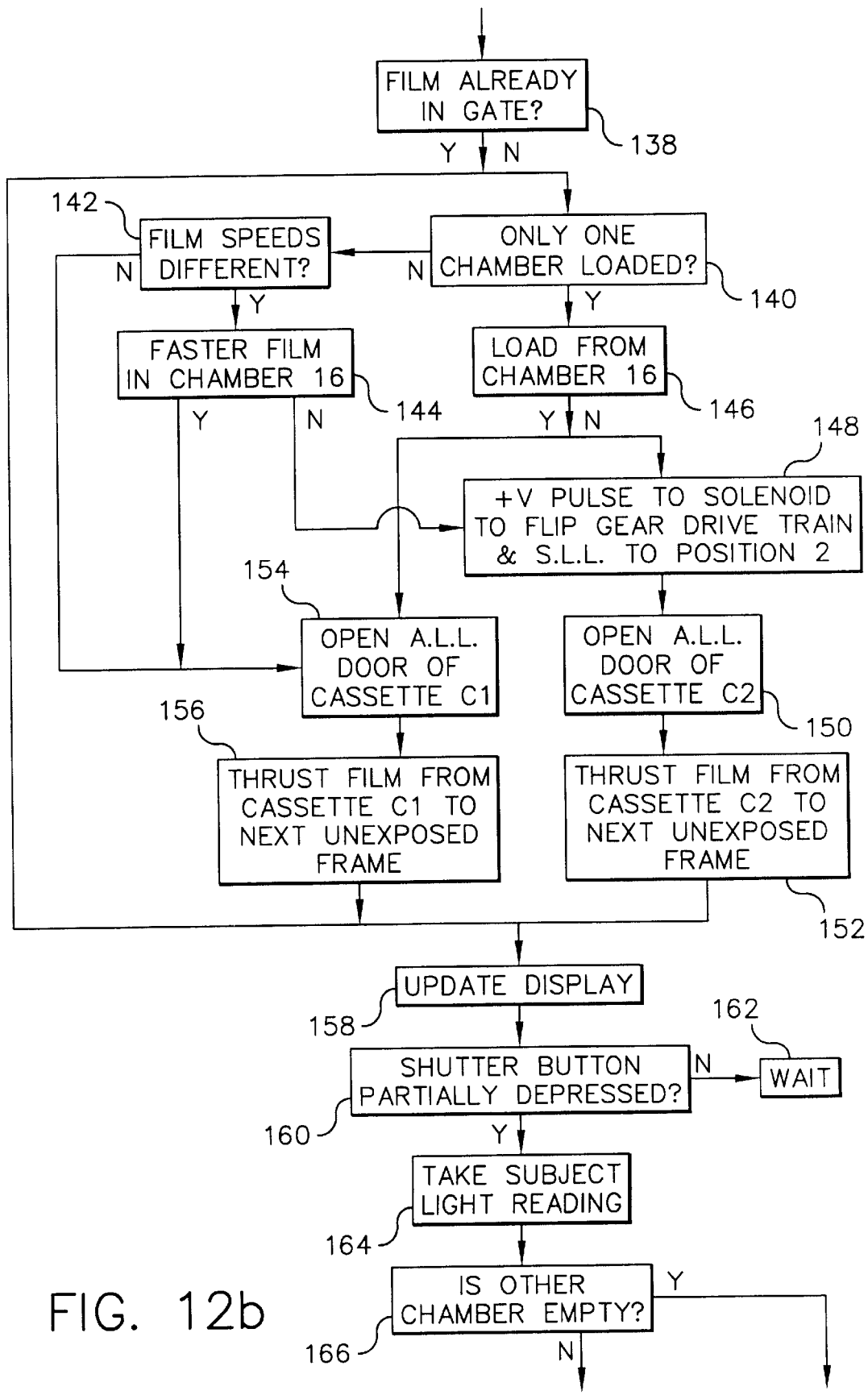
Figure 12C:
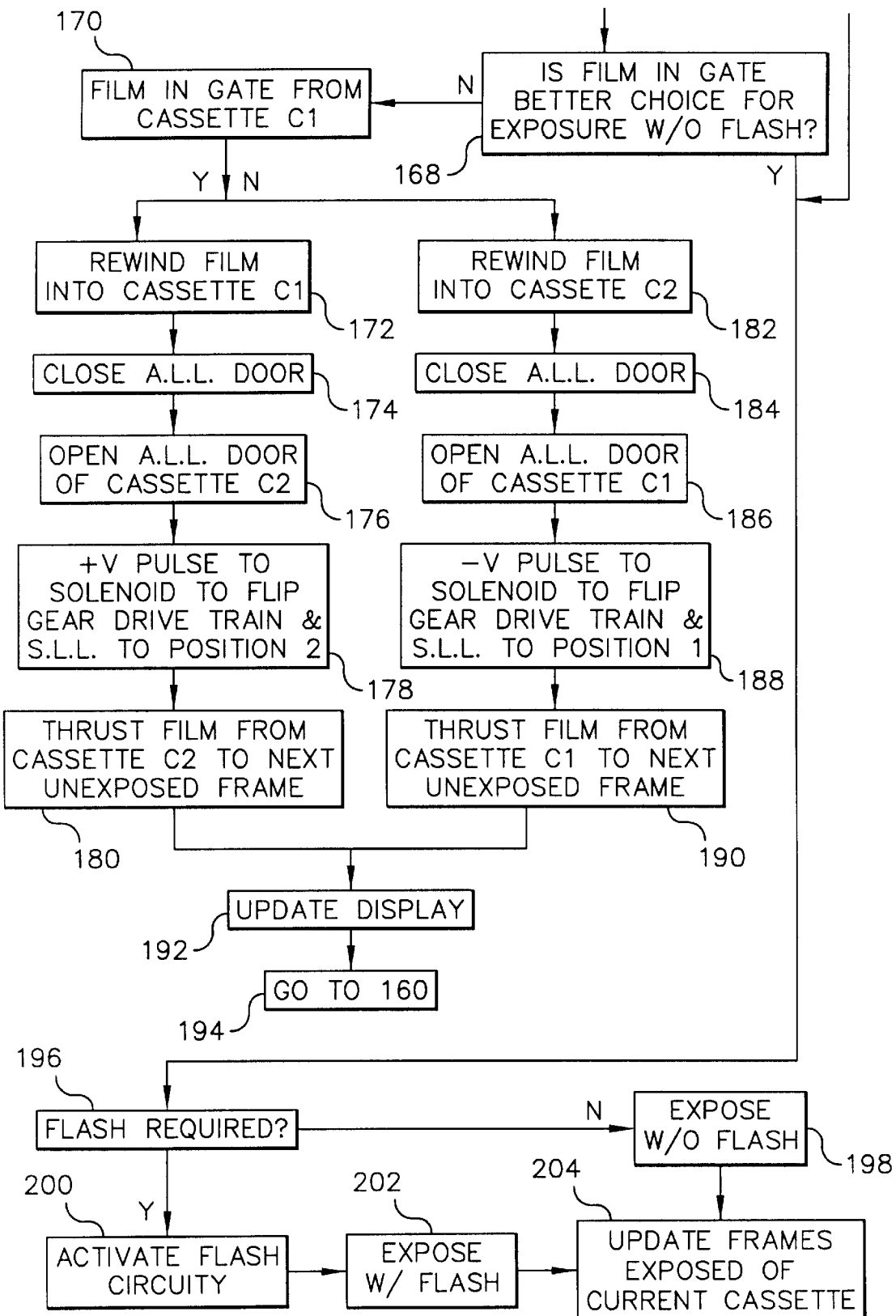
Figure 12D:
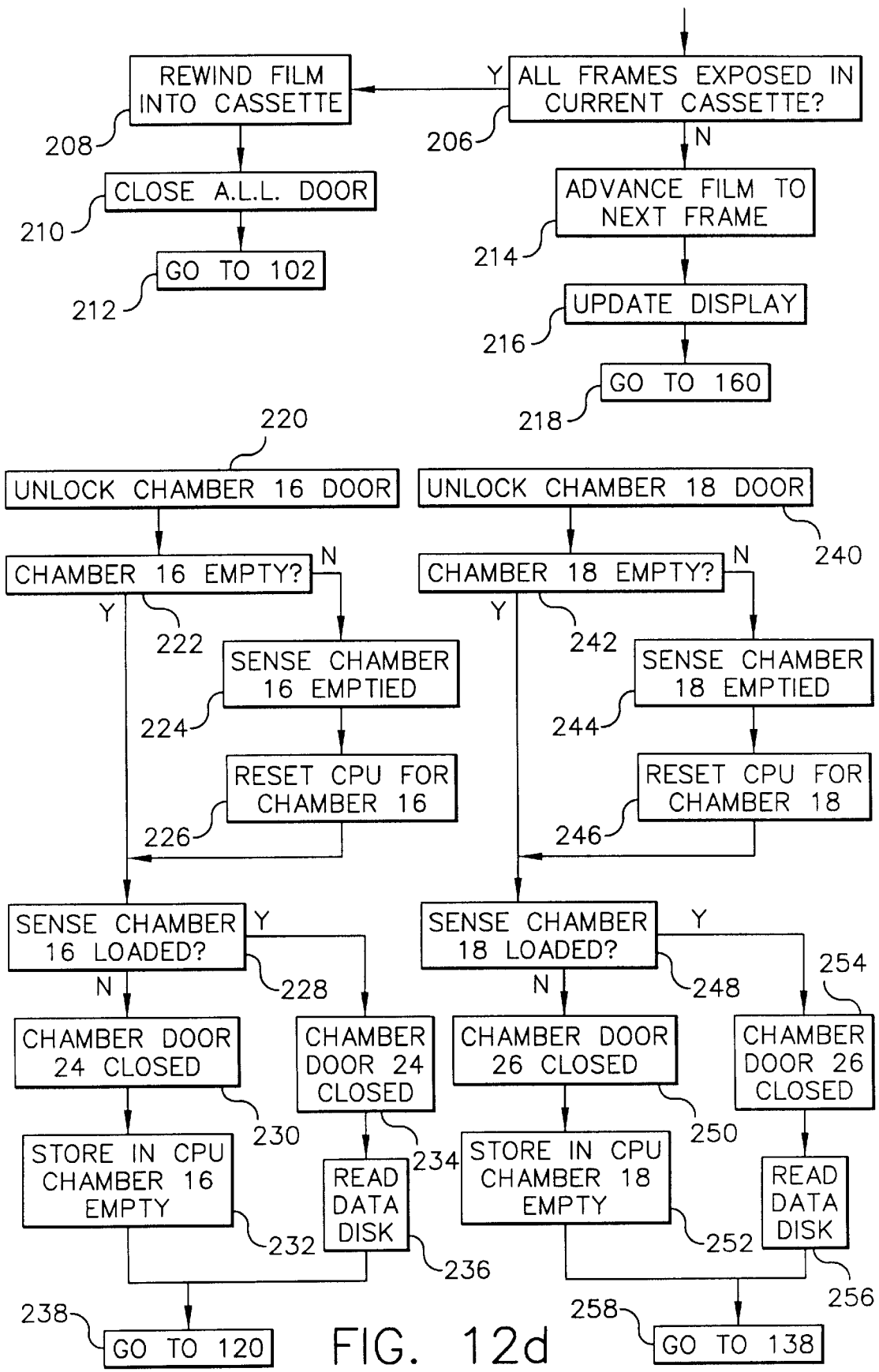

Referring to the Flow Chart in FIG. 12, when camera 10 is turned on, step 100, it performs a check 102 of the status of the loading of the camera 10. It first performs a status check for chamber 16. The CPU 31 has stored in memory all prior exposures of the film in this chamber and thus knows which of the four paths 104, 112, 116, or 118 is appropriate. If chamber 16 is empty, path 104, the CPU directs the display to show "LOAD CASSETTE C1", step 106. If the chamber contains fully exposed and rewound film (A.L.L. door has been closed), path 112, the CPU directs the display to show "REMOVE CASSETTE C1", step 114. In either case the CPU anticipates that a cassette will either be removed from or inserted into chamber 16 and senses when the load/unload button is depressed, step 108. If the load/unload button is not depressed after a short duration, the CPU assumes the user is not ready to load/unload the camera and the logic continues to step 120. If the CPU knows that the film in chamber 16 is unexposed or partially exposed and has been rewound into the cassette C1, path 116, it will proceed to step 120. If the CPU knows that the film in chamber 16 is unexposed or partially exposed and still in the film gate, path 118, it will proceed to step 120. If the user does press the load/unload button, step 108, logic is directed at step 110 to go to step 220, where the CPU unlocks the door to chamber 16. If the CPU already knows that chamber 16 is empty, step 222, then it will sense the insertion of a new cassette into chamber 16, step 228. If the CPU knows that chamber 16 contains a fully exposed and rewound cassette, it will sense removal of the cassette, step 224, and reset its memory for the status of chamber 16 being emptied, step 226. If the user of the camera chooses not to load a new cassette at this time, the door to chamber 16 is closed, step 230, either because it was never opened or because the user opened the door to remove a fully exposed cassette and then closed the door. The CPU stores that chamber 16 is now empty, step 232. If the CPU senses that chamber 16 is loaded with a new cassette C1, step 228, and the door is closed, step 234, then the data disk is read, step 236, to store the ISO film speed and number of exposures provided by the new cassette. The logic flow then returns, step 238, to step 120.

An identical logic flow for checking the status of film in chamber 2 is used in steps 120 to 136 and 240 to 258.

At this point, step 138, there is either film in the gate or film is available for thrusting into the gate. If there is no film in the gate the CPU determines if only one chamber is loaded, step 140. If so, the CPU will determine if chamber 16 is loaded, step 146. Chamber 16 is set as the default position for the slit light lock 64 and engagement of spool drive gear 50 as shown in FIG. 5. If chamber 16 is loaded, the central slit 72 of slit light lock 64 already aligns with film channel 78 and gear 48 is already engaged to drive spool drive gear 50. The active light lock (A.L.L.) door 32 of cassette C1 is opened, step 154, and film is thrust from cassette C1 into the film gate to the next unexposed frame, step 156. If film loading is instead from chamber 18, a pulse of positive DC voltage is applied to the solenoid 40 to flip arm 44 to engage gear 48 to spool drive gear 52 and simultaneously align the central slit 72 of slit light lock 64 to film channel 80, step 148. The A.L.L. door of cassette C2 is opened, step 150, and the film is thrust from the cassette C2 into the gate to the next unexposed frame, step 152.

If both film chambers are loaded, step 140, the CPU will determine if the films are of different ISO film speeds, step 142. If the film speeds are the same then the default to loading from cassette C1 is elected, step 154. If the film speeds are different, the election is to load film from the cassette with the faster ISO speed, step 144, and steps 154 or 148. Lastly, if there is film already in the gate or film has been thrust into the gate, then the LCD displays the status of film loading, step 158.

The camera of the present example is now ready for use with film from one of the cassettes loaded into the gate and is waiting, step 162 for the photographer to partially depress the shutter button, step 160. When the shutter button is partially depressed the camera takes a light reading of the subject, step 164. If the CPU determines that the alternate chamber is empty, step 166, then the CPU determines if electronic flash is required, step 196. If there is a cassette in the alternate chamber, but the CPU determines the film already loaded into the gate is the better choice for exposure without electronic flash, step 168, then the CPU next determines if electronic flash is required for use with this better choice of film, step 196. Exposure is made with electronic flash, steps 200 and 202, or without electronic flash, step 198. The number of frames exposed of the currently loaded cassette is then updated, step 204. If all frames of the current cassette have now been exposed, step 206, the film is rewound from the gate into the current cassette, step 208, the A.L.L. door is closed, step 210, and then the logic returns, step 212, back to step 102 of the flow chart. Returning to step 206, if all frames of the current cassette are not exposed, the film is advanced to the next frame, step 214, the LCD display is updated, step 216, and the logic flow returns, step 218, to step 160 for the next exposure. If at step 168 the film currently loaded in the film gate is not the better choice for exposure without electronic flash, then the CPU determines if the film in the gate is from cassette C1, step 170. If so, the film is rewound, step 172 into cassette C1, the A.L.L. door is closed, step 174, the A.L.L. door of cassette C2 is opened, step 176, a positive DC voltage pulse actuates solenoid 40 to flip gear 48 to drive spool drive gear 52 and align central slit 72 of slit light lock 64 to channel 80, step 178. Film from cassette C2 is thrust to the next unexposed frame, step 180. If at step 170 the CPU has determined that the film in the gate is from cassette C2, then the film is rewound, step 182, into cassette 2, the A.L.L. door is closed, step 184, the A.L.L. door of cassette C1 is opened, step 186, a negative DC voltage pulse actuates solenoid 40 to flip gear 48 to drive spool drive gear 50 and align central slit 72 of slit light lock 64 to align with film channel 78, step 188, and then the film from cassette C1 is thrust to the next unexposed frame, step 190. In either case after film is thrust into the gate, the LCD display is updated, step 192, and the logic flow returns at step 194 to step 160.

Figure 13:
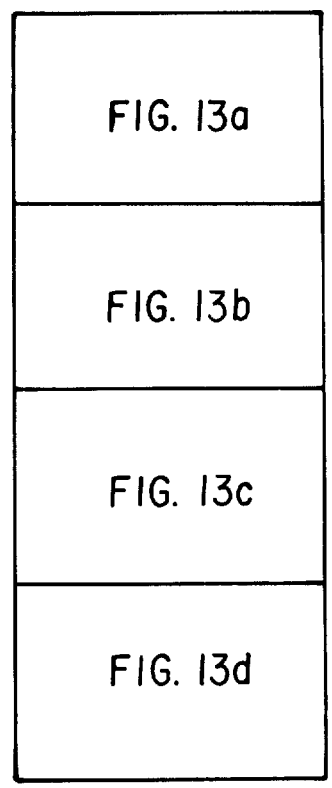
FIG. 13 is a typical flow chart for the basic operation of a camera having two single-chamber doors where the priority of operation is to minimize the frequency of film changes by employing electronic flash.
Figure 13A:
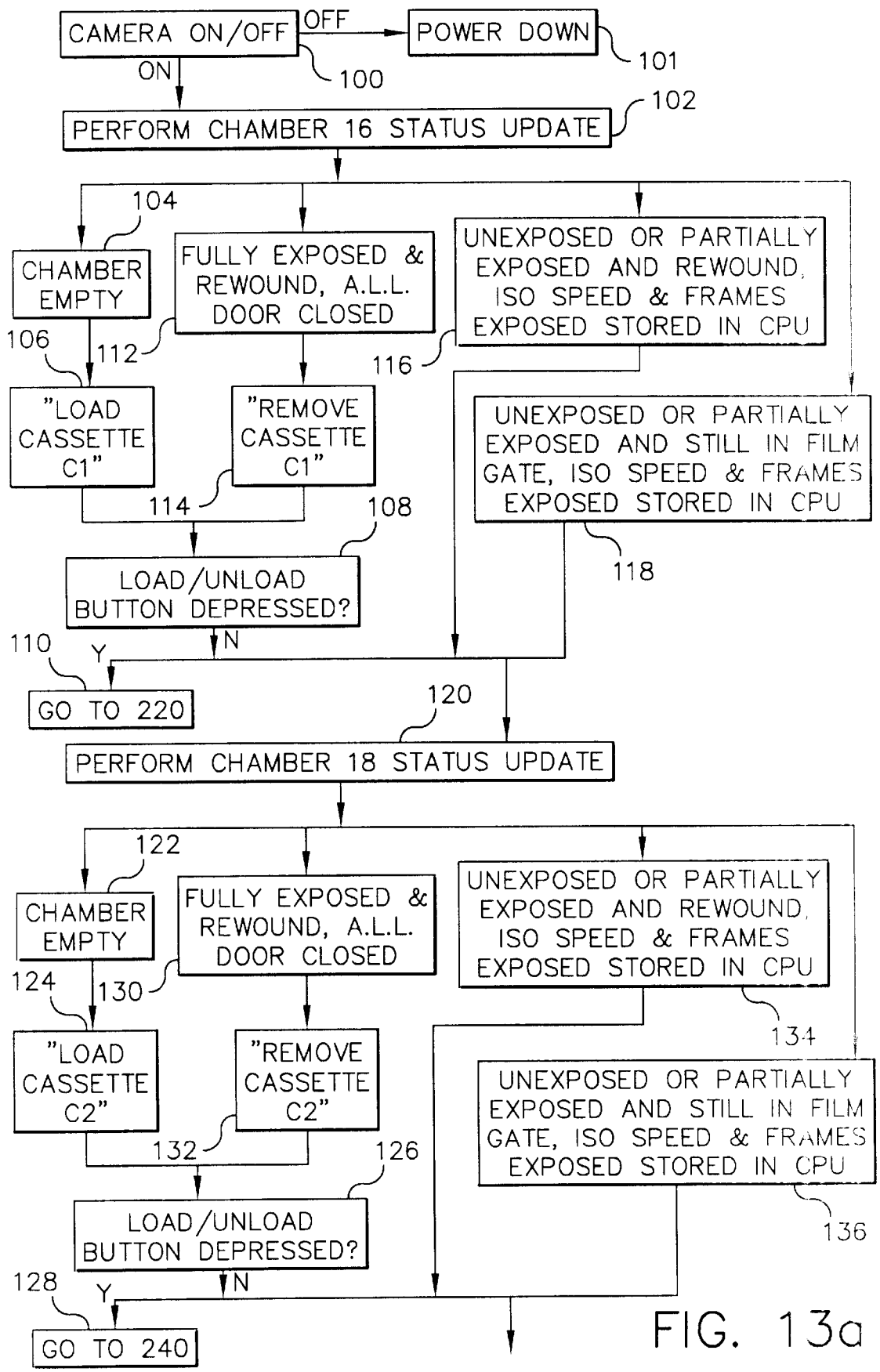
Figure 13B:
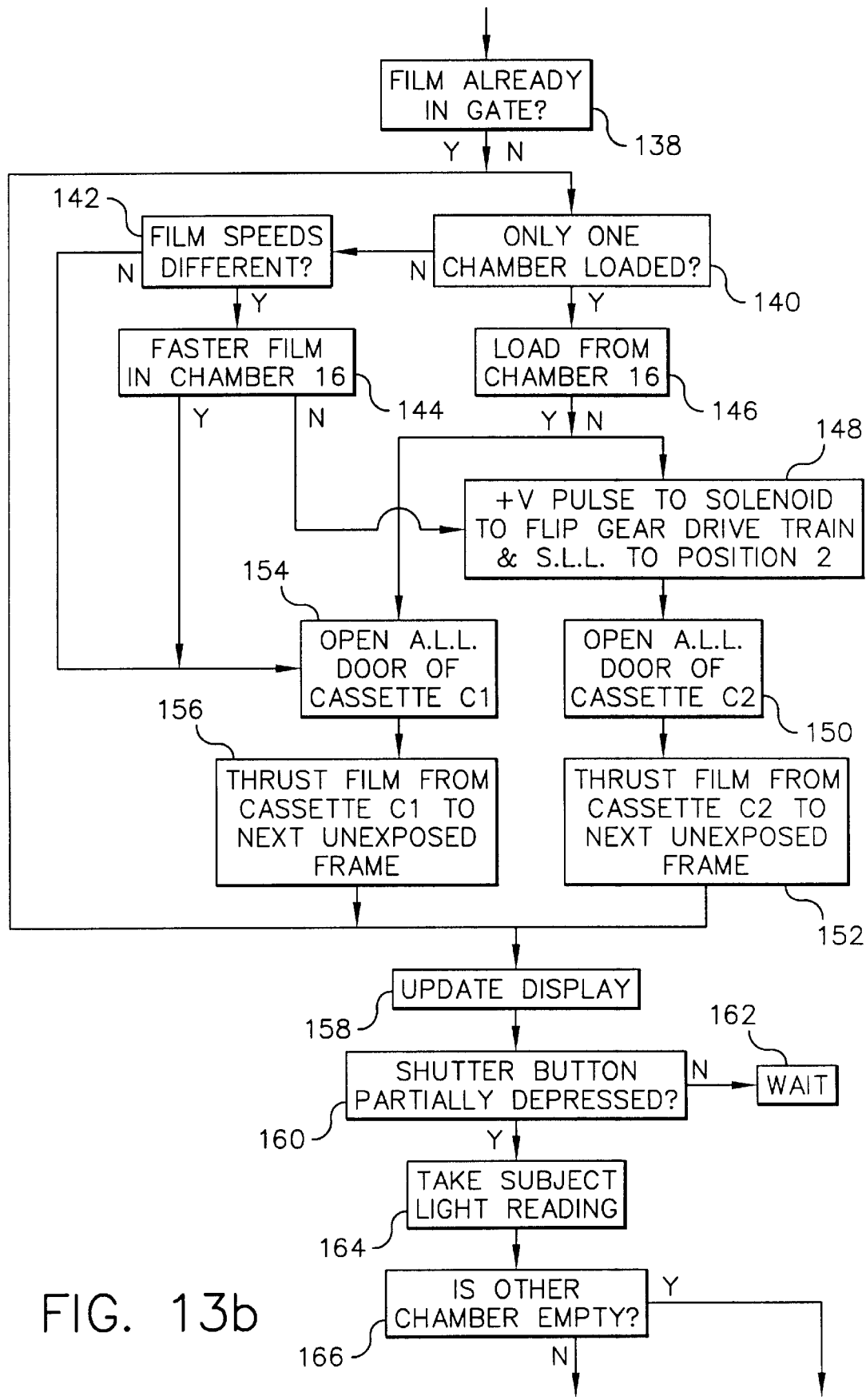
Figure 13C:
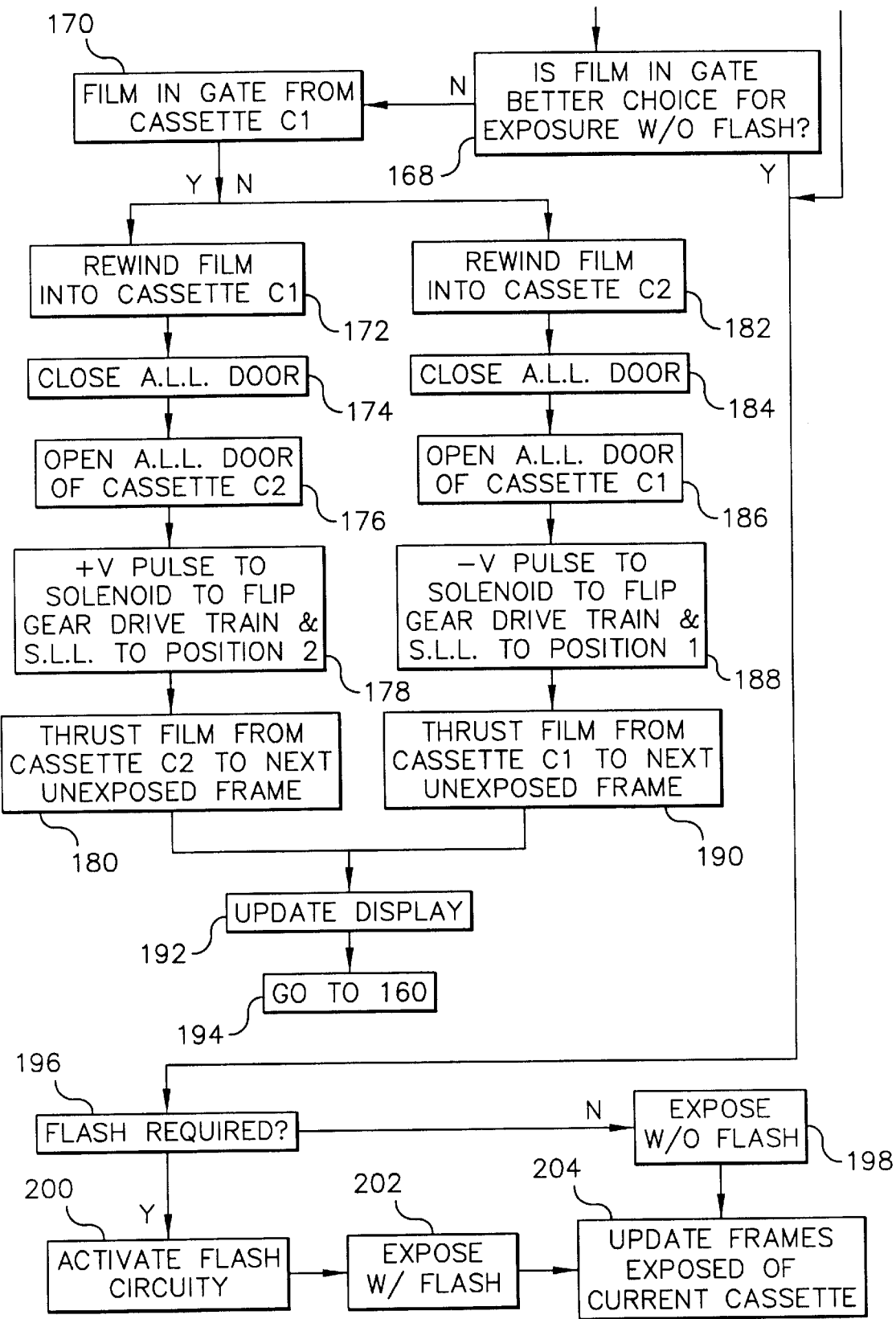
Figure 13D:
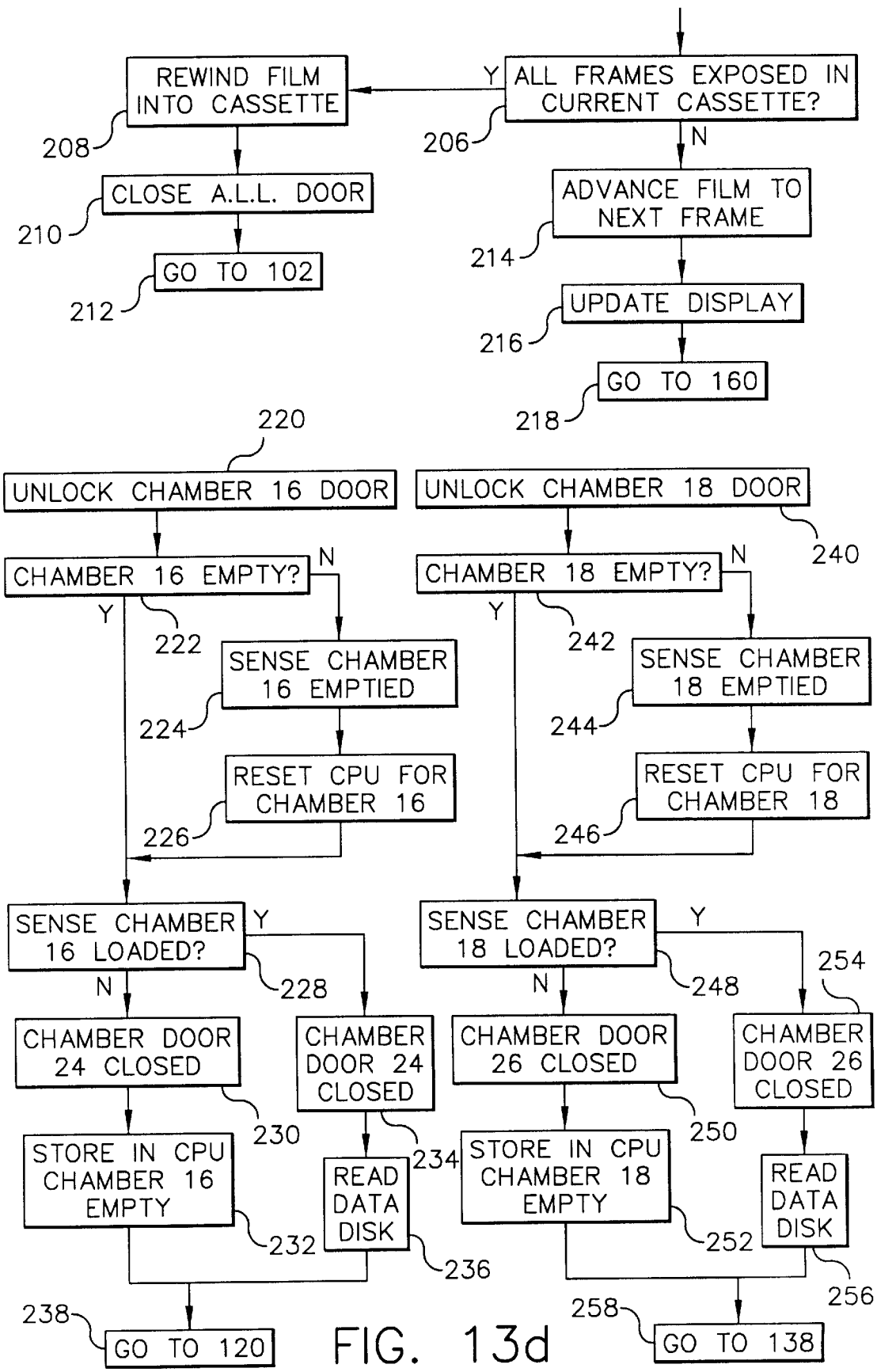

Another example of the operation of the camera of the present invention will now be described with reference to the Flow Chart in FIG. 13. The operation of the camera in this example is governed by the priority that electronic flash is optional and can be used to reduce the frequency of film changes to a faster ISO speed. If ambient lighting conditions change such that the current film in the gate requires electronic flash to receive proper exposure, then electronic flash is used and no film change is made. If the CPU determines that the film currently in the gate cannot receive proper exposure with the aid of electronic flash and the other chamber contains film of a greater ISO speed, then the film change is made automatically. The logic flow in FIG. 13 is exactly the same as in FIG. 12 except at step 169 where the decision is made as to whether the film in the gate is the better choice for exposure with electronic flash as an option. Many aspects of the operation of an actual camera are not included in this flow chart as they are not relevant to describing the invention.

Another example is the operation of camera 10' having one two-chamber door and no slit light lock which will now be described with reference to the Flow Chart in FIG. 14. The operation of the camera in this example is governed by a microprocessor programmed with the priority that electronic flash be used as seldom as possible. If lighting conditions change such that the current film in the gate would require use of electronic flash, but the film in the other cassette is of greater ISO speed and may or may not require electronic flash, then the film change is made automatically. Many aspects of the operation of an actual camera are not included in this flow chart as they are not relevant to describing the invention.

Figure 14:
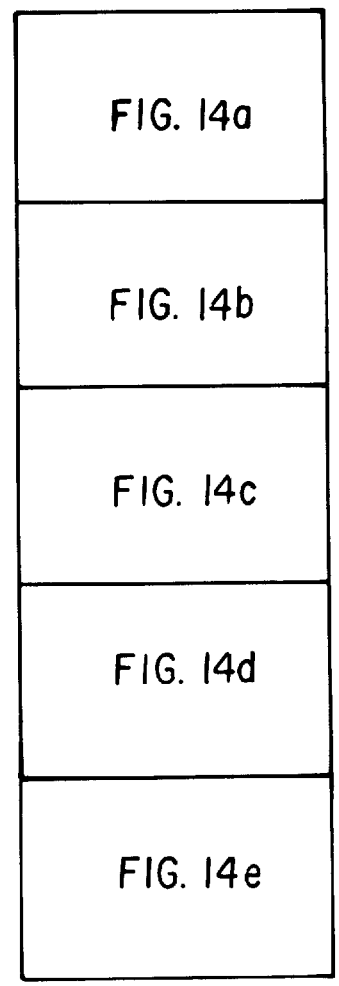
FIG. 14 is a typical flow chart for the basic operation a camera having one two-chamber door where the priority of operation is to minimize use of the camera's electronic flash.
Figure 14A:
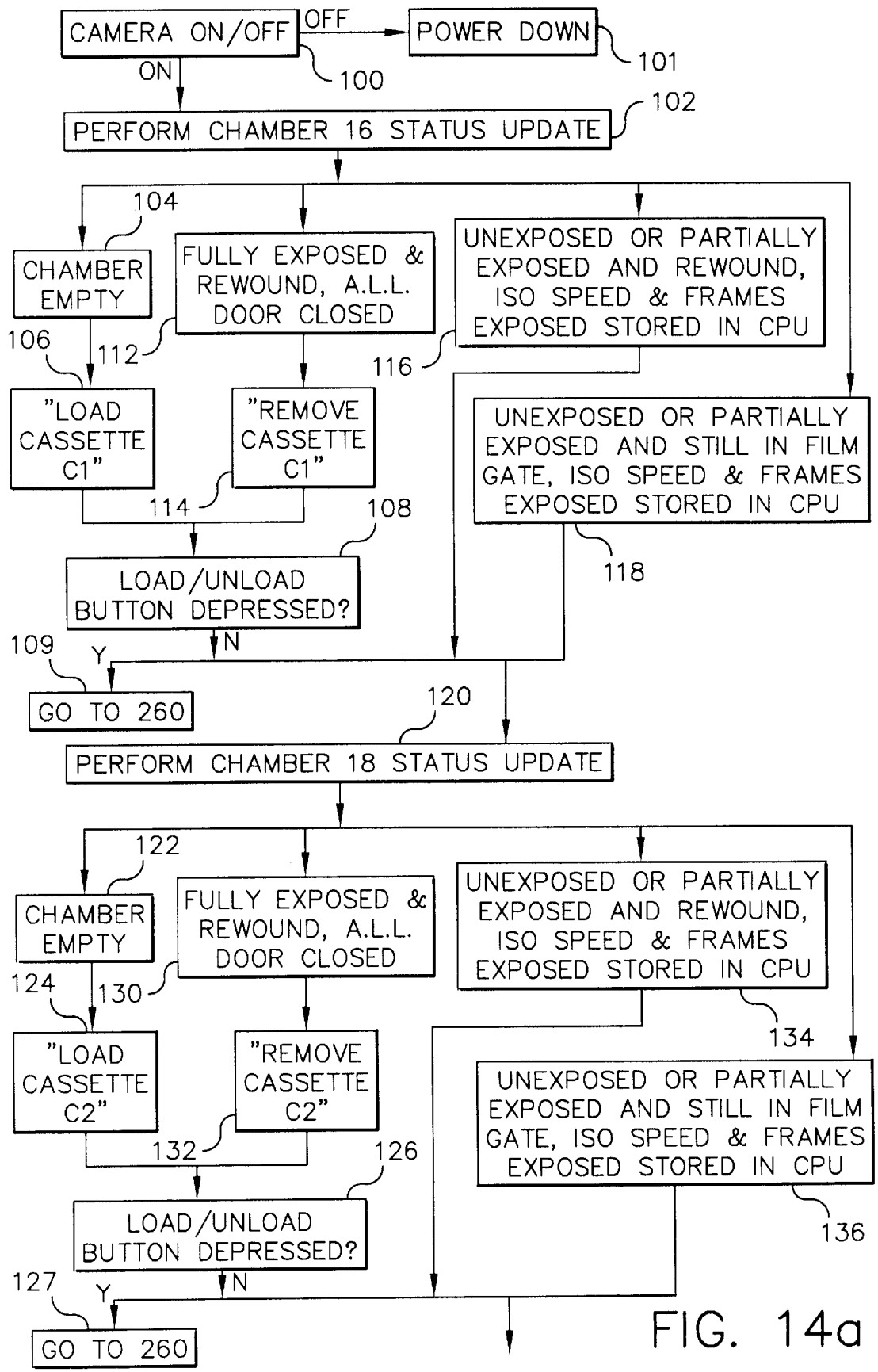
Figure 14B:
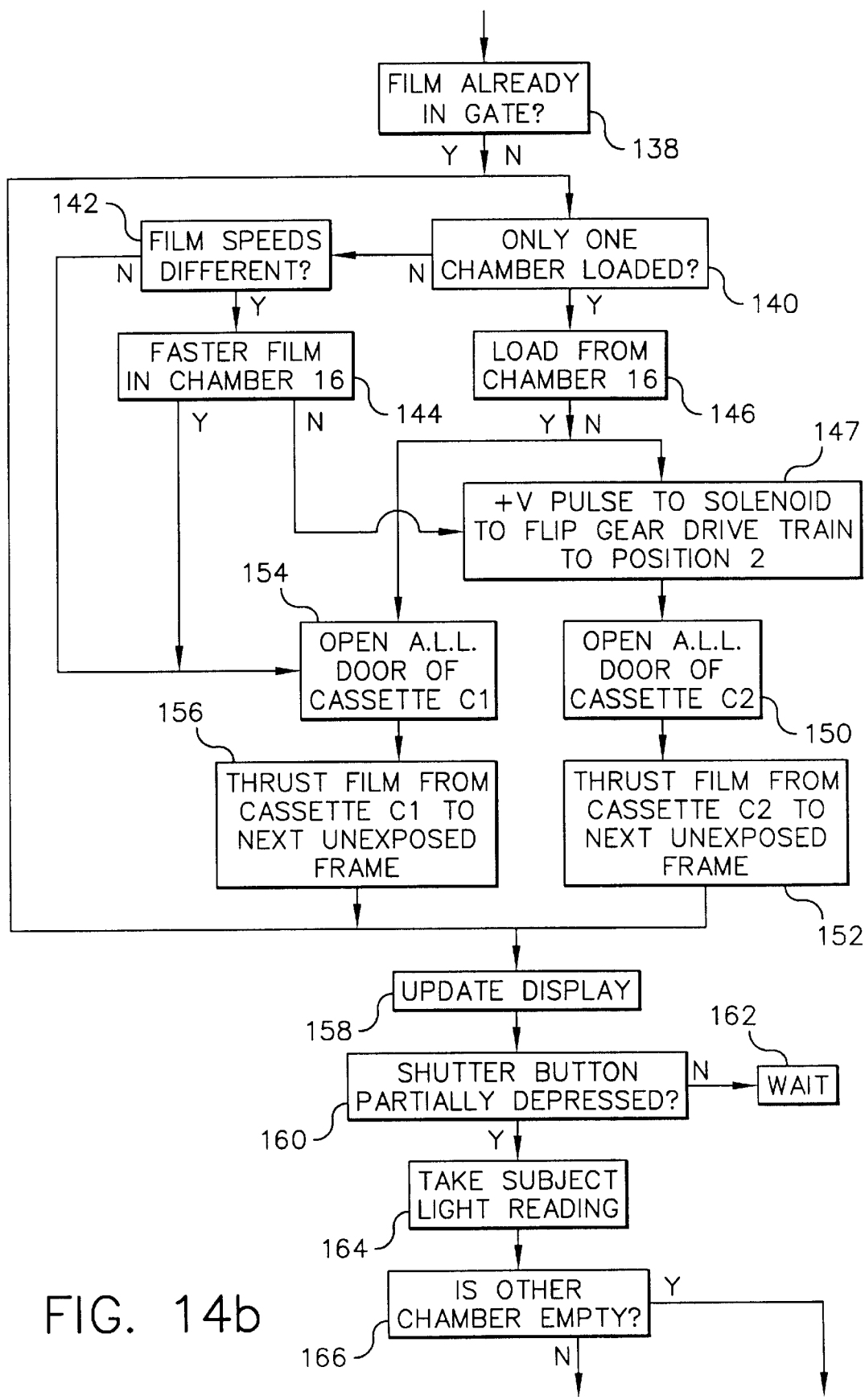
Figure 14C:
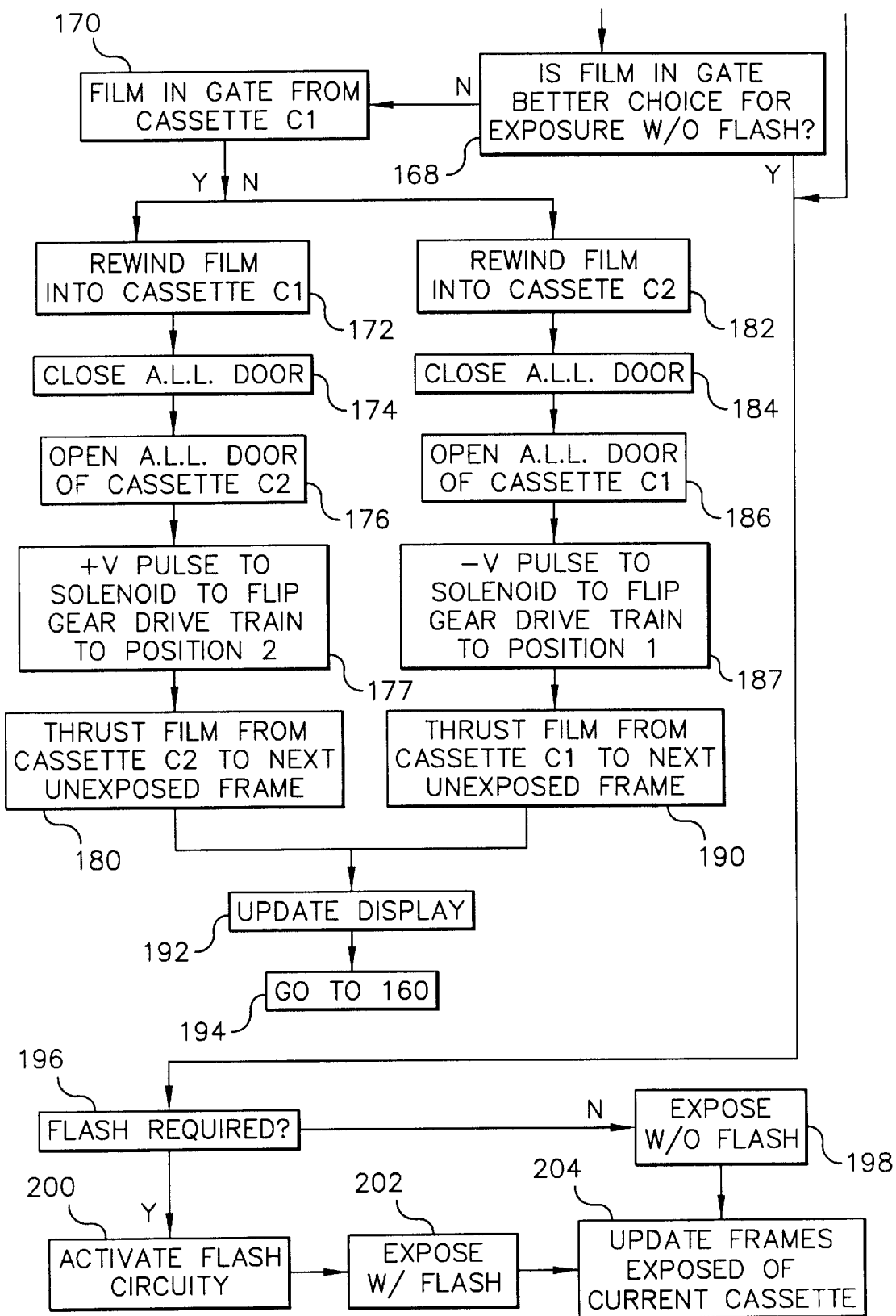
Figure 14D:
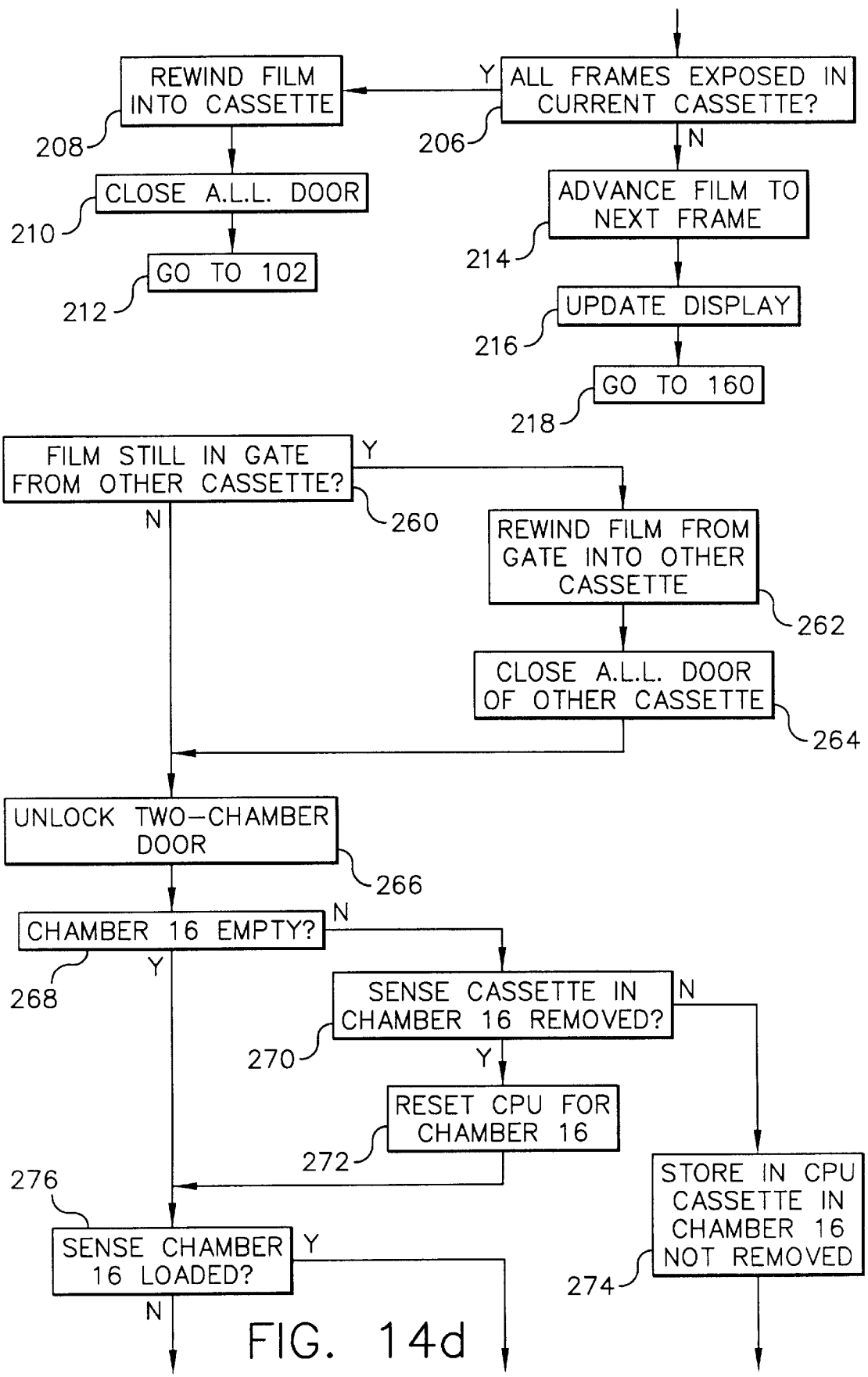
Figure 14E:
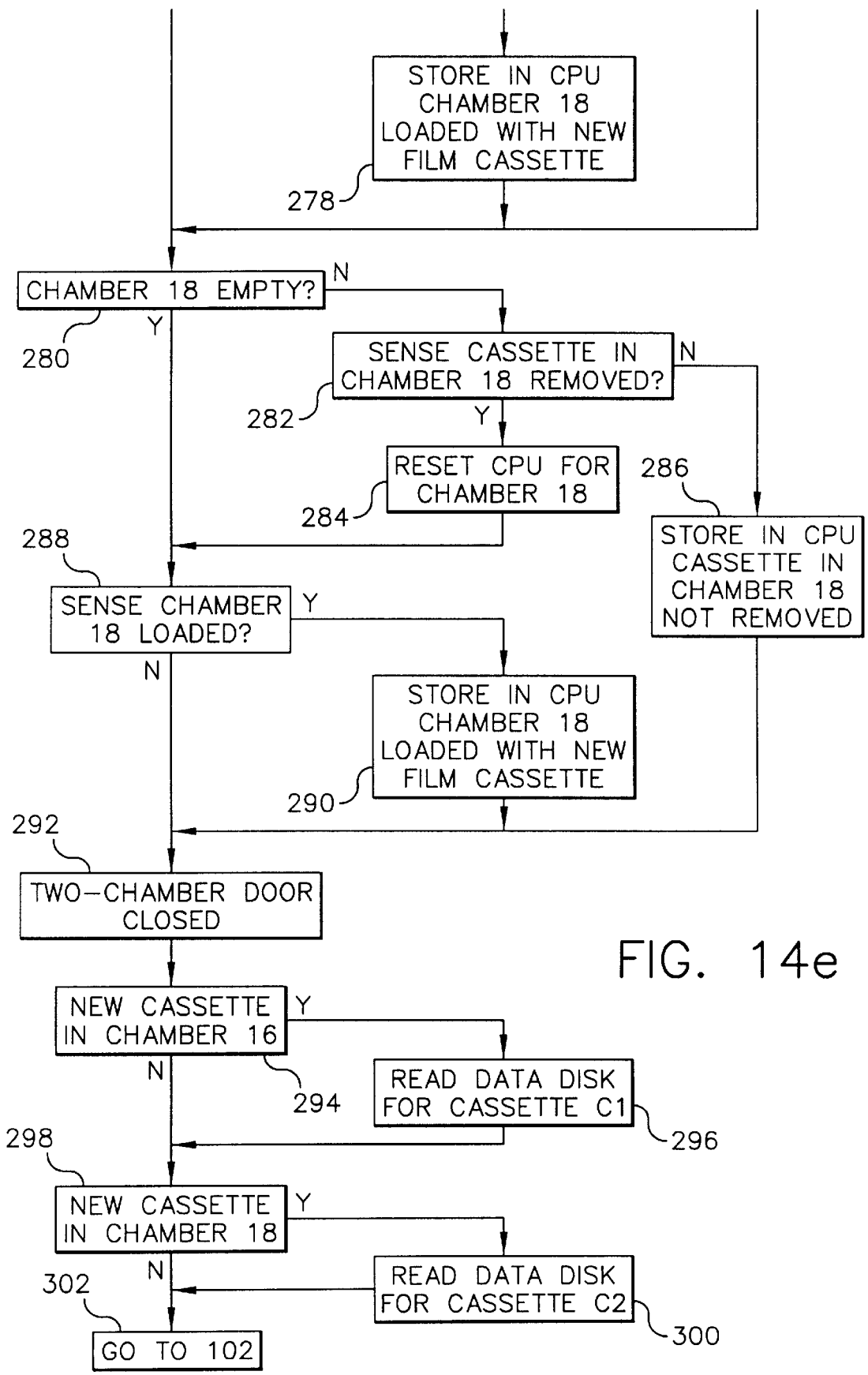

Referring to the Flow Chart in FIG. 14, when camera 10' is turned on, step 100, it performs a check of the status of the loading of the camera. It first performs a status check, step 102, for chamber 16. The CPU has stored in memory all prior exposures of the film in this chamber and thus knows which of the four paths 104, 112, 116, or 118 is appropriate. If chamber 16 is empty, path 104, the CPU directs the display to show "LOAD CASSETTE C1", step 106. If the chamber contains fully exposed and rewound film (A.L.L. door has been closed), path 112, the CPU directs the display to show "REMOVE CASSETTE C1", step 114. In either case the CPU anticipates that a cassette will either be removed from or inserted into chamber 16 and senses when the load/unload button is depressed, step 108. If the load/unload button is not depressed after a short duration, the CPU assumes the user is not ready to load/unload the camera and the logic continues to step 120. If the CPU knows that the film in chamber 16 is unexposed or partially exposed and has been rewound into the cassette, path 116, it will proceed to step 120. If the CPU knows that the film in chamber 16 is unexposed or partially exposed and still in the film gate, path 118, it will proceed to step 120. If the user does press the load/unload button, step 108, logic is directed at step 109 to go to step 260, where the CPU determines if film is still in the film gate from the other film cassette. If so, then the CPU directs the rewinding of the film from the gate into the other cassette, step 262, and the closing of the A.L.L. door of that cassette, step 264. If no film is in the film gate, then the CPU directs unlocking the two-chamber door, step 266. A pair of film cassette presence sensors 267, 269 are located in chambers 16 and 18 respectively (see FIGS. 5, 8). Film presence sensor 267 informs the CPU at step 268 if chamber 16 is empty. If not, the film presence sensor 267 informs the CPU when the cassette in chamber 16 has been removed at step 270. When the cassette C1 is removed the CPU stores this information for chamber 16 at step 272 and the logic flows to step 276. If the cassette C1 in chamber 16 is not removed, the CPU stores this information, step 274, and the logic flows to step 280. At step 276, the presence sensor informs the CPU if chamber 16 has been loaded with a new film cassette. If so, the existence of a new film cassette in chamber 16 is stored in memory by the CPU, step 278, and if not, logic flows directly to step 280. At step 280 the film cassette presence sensor 269 for chamber 18 informs the CPU if chamber 18 is empty. If so, logic continues to step 288. At step 282 the CPU determines by means of the film presence sensor if the film cassette in chamber 18 has been removed. If not, the CPU stores in memory that the cassette in chamber 18 has not been removed, step 286. If the cassette has been removed, the CPU is reset for chamber 18 being emptied, step 284. At step 288, the film presence sensor 269 informs the CPU if a new film cassette has been loaded into chamber 18. If so, the CPU records that chamber 18 is loaded with a new cassette, step 290. Otherwise the logic flows directly to step 292. At step 292, the CPU determines that the two-chamber door 92 has been closed. The user of the camera has been prompted by the camera display in steps 106, 114, 124, or 132 as to which film cassette to remove when the two-chamber door 92 is opened. At step 294, the CPU determines if a new cassette C1 has been loaded into chamber 16. If so, the data disk for cassette C1 is read at step 296 to record the ISO film speed and number of exposures available. At step 298 the CPU determines if a new cassette C2 has been loaded into chamber 18. If so, the data disk for cassette C2 is read at step 300. At step 302 the logic flows back to step 102.

An identical logic flow for checking the status of film in chamber 18 is used in steps 120 to 136.

At this point, step 138, there is either film in the gate or film is available for thrusting into the gate. If there is no film in the gate the CPU determines if only one chamber is loaded, step 140. If so, the CPU will determine if chamber 16 is loaded, step 146. Chamber 16 is set as the default position for engagement of the spool drive gear 50. If chamber 16 is loaded gear 48 is already engaged to drive spool drive gear 50. The active light lock (A.L.L.) door 32 of cassette C1 is opened, step 154, and film is thrust from cassette C1 into the film gate to the next unexposed frame, step 156. If film loading is instead from chamber 18, a pulse of positive DC voltage is applied to the solenoid 40 to flip arm 44 to engage gear 48 to spool drive gear 52, step 147. The A.L.L. door of cassette C2 is opened, step 150, and the film is thrust from the cassette into the gate to the next unexposed frame, step 152.

If both film chambers are loaded, step 140, the CPU will determine if the films are of different ISO film speeds, step 142. If the film speeds are the same then the default to loading from cassette C1 is elected, step 154. If the film speeds are different, the election is to load film from the cassette with the faster ISO speed, step 144, and steps 154 or 147. Lastly, if there is film already in the gate or film has been thrust into the gate, then the LCD displays the status of film loading, step 158.

The camera of the present example is now ready for use with film from one of the cassettes loaded into the gate and is waiting, step 162, for the photographer to partially depress the shutter button, step 160. When the shutter button is partially depressed the camera takes a light reading of the subject, step 164. If the CPU determines that the alternate chamber is empty, step 166, then the CPU determines if electronic flash is required, step 196. If there is a cassette in the alternate chamber, but the CPU determines the film already loaded into the gate is the better choice for exposure without electronic flash, step 168, then the CPU next determines if electronic flash is required for use with this better choice of film, step 196. Exposure is made with electronic flash, steps 200 and 202, or without electronic flash, step 198. The number of frames exposed of the currently loaded cassette is then updated, step 204. If all frames of the current cassette have now been exposed, step 206, the film is rewound from the gate into the current cassette, step 208, the A.L.L. door is closed, step 210, and then the logic returns, step 212, back to step 102 of the flow chart. Returning to step 206, if all frames of the current cassette are not exposed, the film is advanced to the next frame, step 214, the LCD display is updated, step 216, and the logic flow returns, step 218, to step 160 for the next exposure. If at step 168 the film currently loaded in the film gate is not the better choice for exposure without electronic flash, then the CPU determines if the film in the gate is from cassette 1, step 170. If so, the film is rewound, step 172 into cassette C1, the A.L.L. door is closed, step 174, the A.L.L. door of cassette C2 is opened, step 176, a positive DC voltage pulse actuates solenoid 40 to flip gear 48 to drive spool drive gear 52, step 177. Film from cassette C2 is thrust to the next unexposed frame, step 180. If at step 170 the CPU has determined that the film in the gate is from cassette C2, then the film is rewound, step 182, into cassette C2, the A.L.L. door is closed, step 184, the A.L.L. door of cassette C1 is opened, step 186, a negative DC voltage pulse actuates solenoid 40 to flip gear 48 to drive spool drive gear 52, step 187, and then the film from cassette C1 is thrust to the next unexposed frame, step 190. In either case after film is thrust into the gate, the LCD display is updated, step 192, and the logic flow returns at step 194 to step 160.

Figure 15:
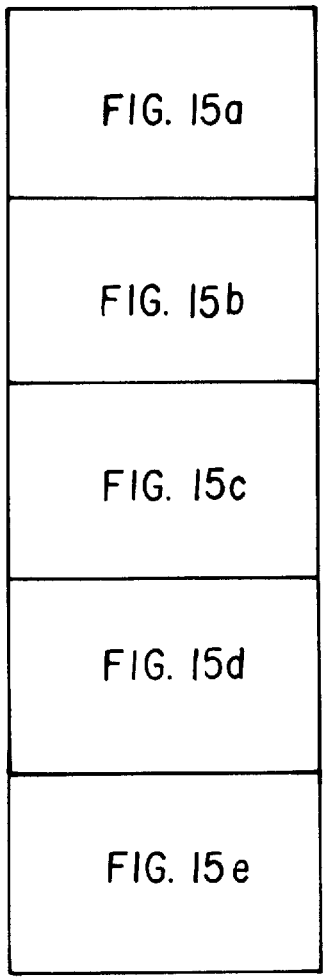
FIG. 15 is a typical flow chart for the basic operation of a camera having one two-chamber door where the priority of operation is to minimize the frequency of film changes by employing electronic flash.
Figure 15A:
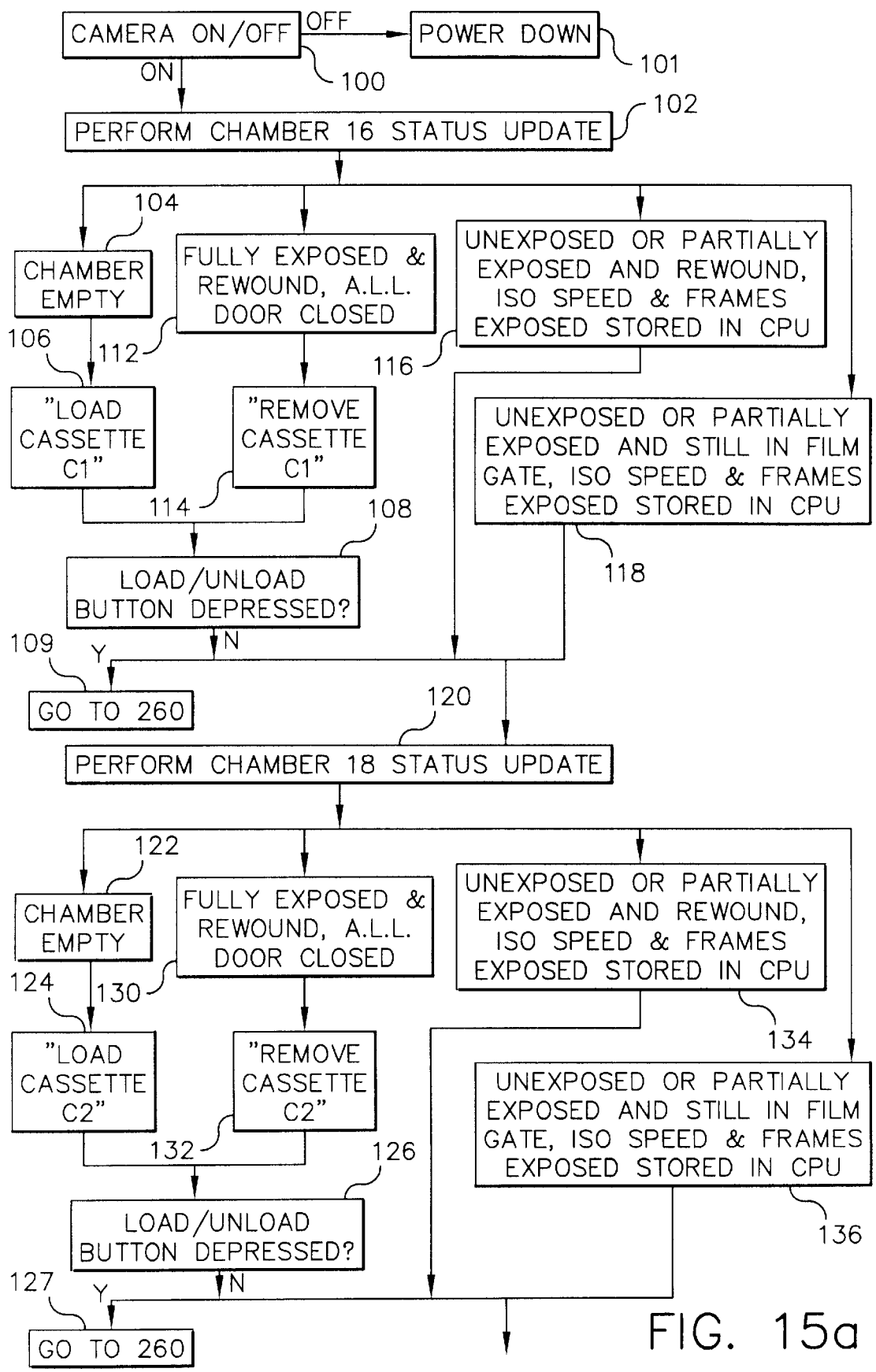
Figure 15B:
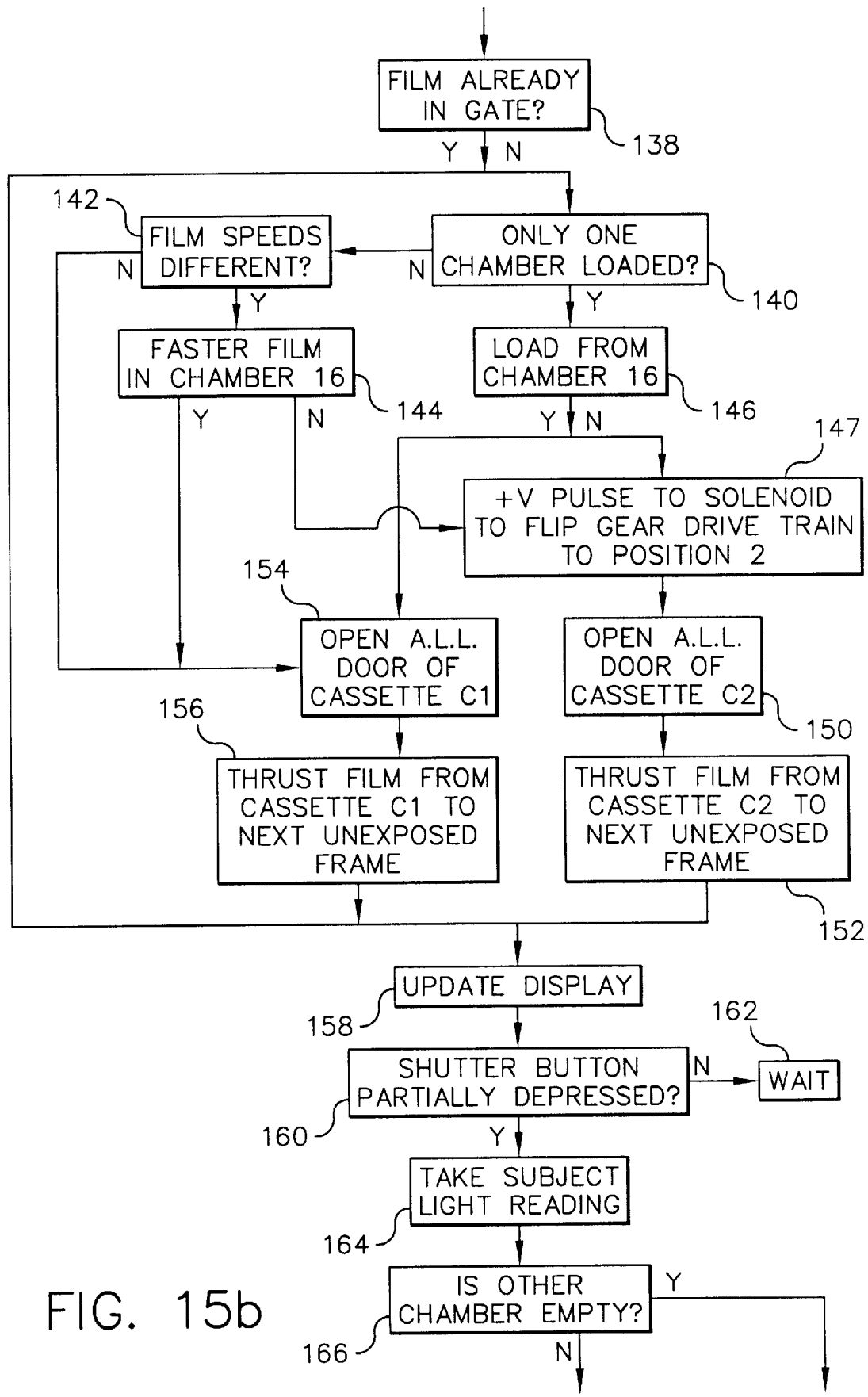
Figure 15C:
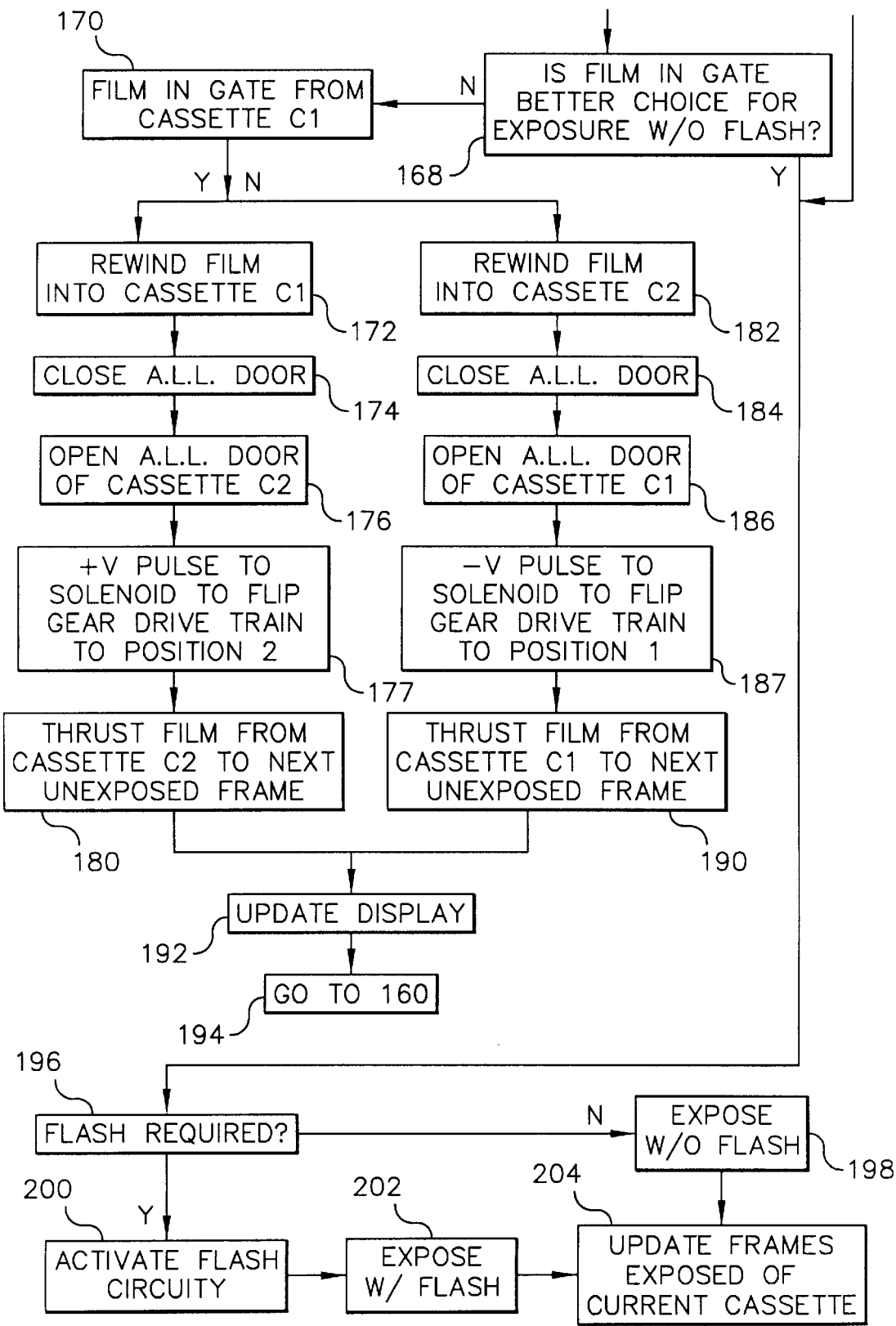
Figure 15D:
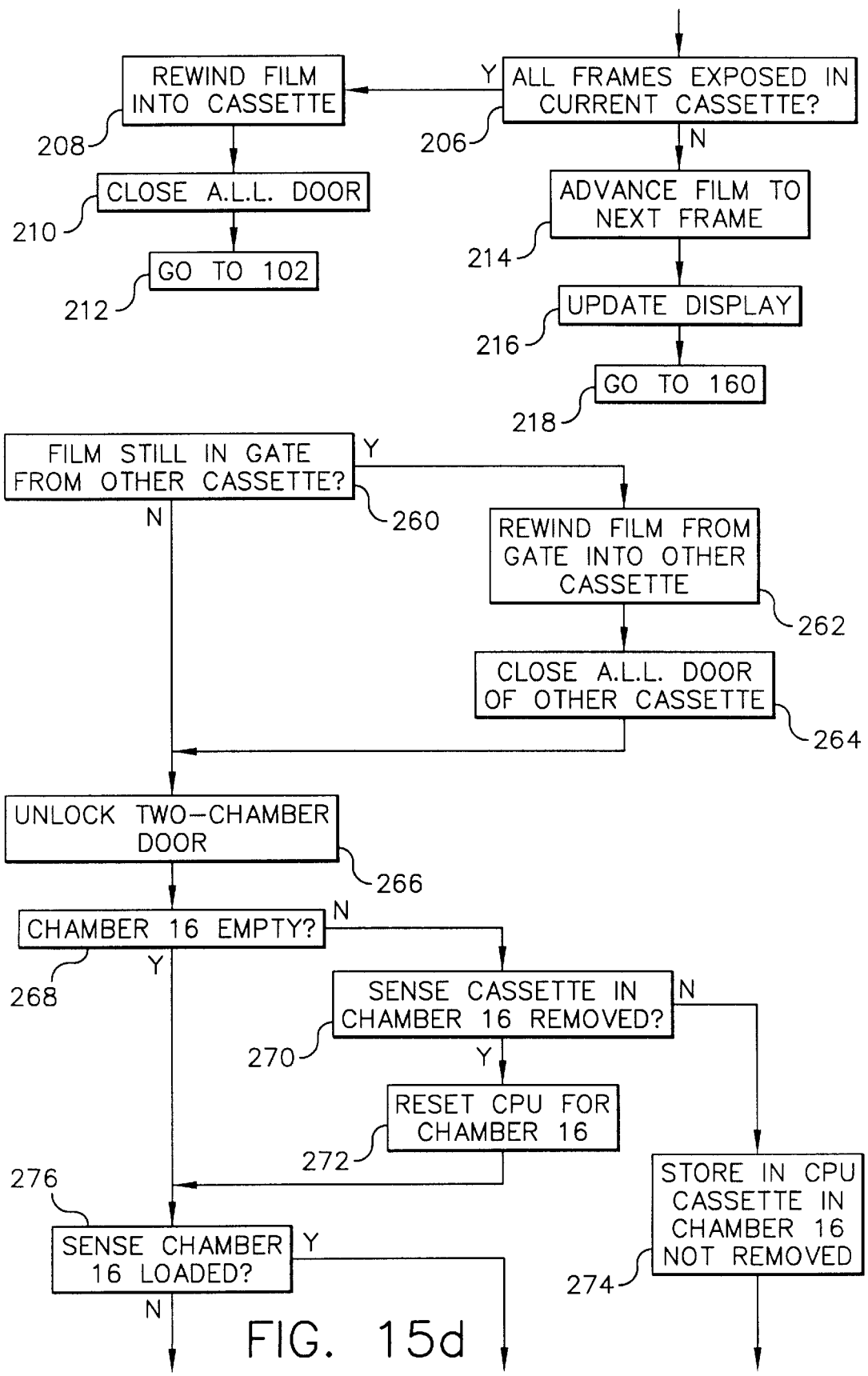
Figure 15E:
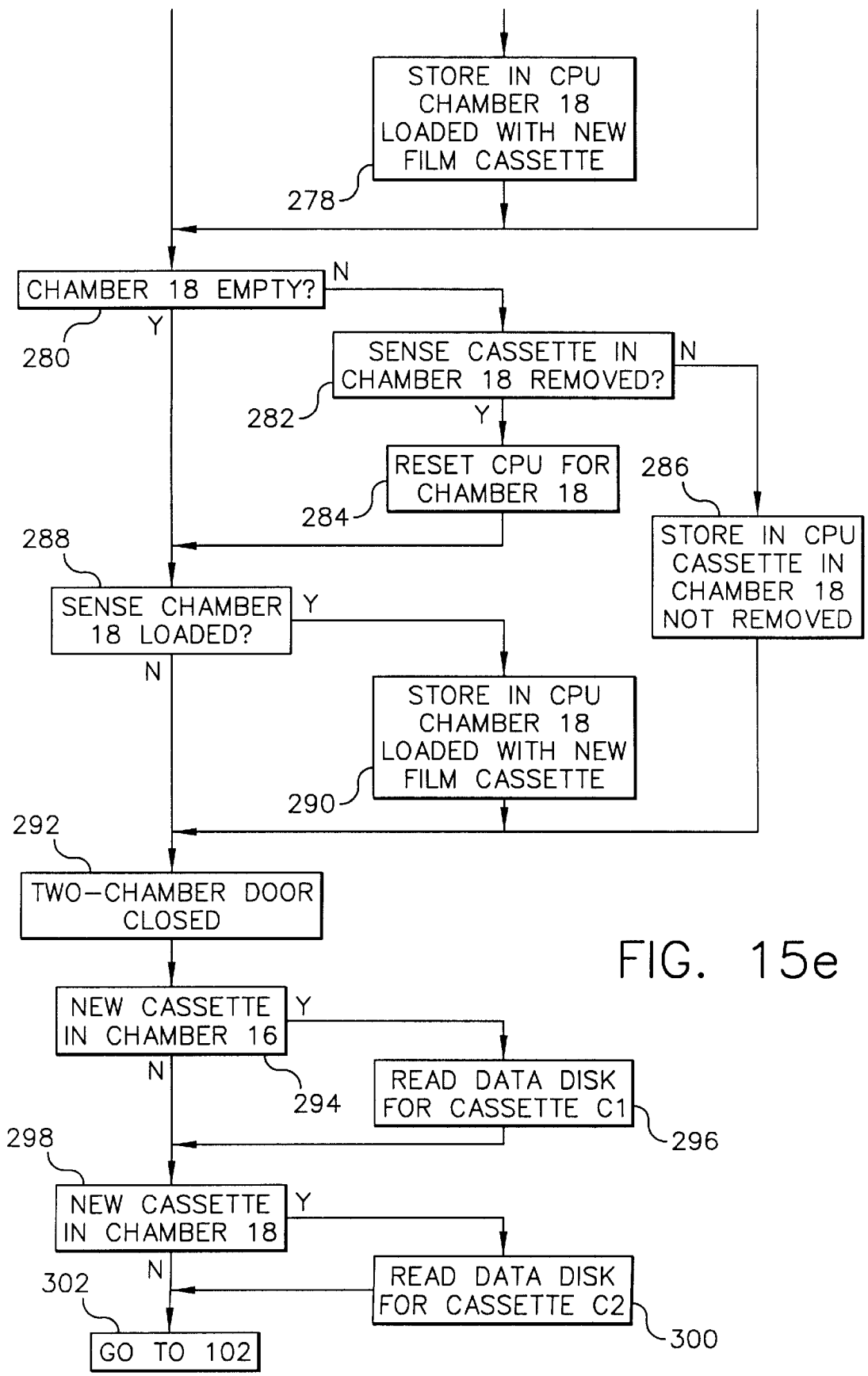

Another example of the operation of the camera of the present invention will now be described with reference to the Flow Chart in FIG. 15. The operation of the camera in this example is governed by the priority that electronic flash is optional and can be used to reduce the frequency of film changes to a faster ISO speed. If ambient lighting conditions change such that the current film in the gate requires electronic flash to receive proper exposure, then electronic flash is used and no film change is made. If the CPU determines that the film currently in the gate cannot receive proper exposure with the aid of electronic flash and the other chamber contains film of a greater ISO speed, then the film change is made automatically. The logic flow in FIG. 15 is exactly the same as in FIG. 14 except at step 169 where the decision is made as to whether the film in the gate is the better choice for exposure with electronic flash as an option. Many aspects of the operation of an actual camera are not included in this flow chart as they are not relevant to describing the invention.

The invention has been described in detail with reference to a preferred embodiment; However, it will be appreciated that variations and modifications can be effected by a person of ordinary skill in the art without departing from the scope of the invention.

PARTS LIST

C1 Film Cassette
C2 Film Cassette
10 still picture camera with two single-chamber doors
10' still picture camera with a two-chamber door
12 back of camera
14 underside of camera
16 cassette C1 chamber
18 cassette C2 chamber
23 spool centering pin
24 chamber 16 door
25 spool centering pin
26 chamber 18 door
28 door open/closed sensor
29 door open/closed sensor
30 film cassette
31 central processing unit (CPU)
32 active light lock door
34 film status indicators
35 cartridge spool
36 data disk
37 liquid crystal display (LCD)
38 doorlock
39 doorlock
40 bidirectional direct current latching solenoid
41 film cassette light lock driver
42 piston
43 film cassette light lock driver
44 pivot arm
46 gear
48 gear
50 spool drive gear
52 spool drive gear
54 motor-driven gear
55 film perforation sensor
56 film
57 film channel
58 film gate
59 data disk reader
60 spooling chamber
61 data disk reader
62 front of camera
64 slit light lock
66 light baffle
68 light baffle
69 electronic flash
70 wall
72 central slit
74 wall
76 rib
78 film channel
79 film channel
80 film channel
82 arm
84 compression spring
92 two-chamber door
94 spool centering pin
96 spool centering pin
100 step, camera on/off sensing
101 step, power down mode
102 step, perform chamber 16 status update
104 path, chamber 16 empty condition
106 step, display "LOAD CASSETTE C1"
108 step, CPU decision: load/unload button depressed? Y or N
109 step, go to step 260
110 step, go to step 220
112 path, film fully exposed & rewound and A.L.L. door closed condition
114 step, display "REMOVE CASSETTE C1"
116 path, film unexposed or partially exposed and rewound, ISO film speed and frames exposed stored in CPU
118 path, film unexposed or partially exposed and still in film gate, ISOfilm speed and frames exposed stored in CPU 120 step, perform chamber 18 status update
122 path, chamber 18 empty condition
124 step, display "LOAD CASSETTE C2"
126 step, CPU decision: load/unload button depressed? Y or N
127 step, go to step 260
128 step, go to step 240
130 path, film fully exposed & rewound and A.L.L. door closed condition
132 step, display "REMOVE CASSETTE C2"
134 path, film unexposed or partially exposed and rewound, ISO film speed and frames exposed stored in CPU
136 path, film unexposed or partially exposed and still in film gate, ISO speed and frames exposed stored in CPU
138 step, CPU decision: film already in film gate? Y or N
140 step, CPU decision: only one chamber loaded? Y or N
142 step, CPU decision: film speeds different? Y or N
144 step, CPU decision: faster film in chamber 1? Y or N
146 step, CPU decides: load from chamber 1? Y or N
147 step, CPU supplies +V pulse to solenoid to flip gear drive to position 2
148 step, CPU supplies +V pulse to solenoid to flip gear drive train & slit light lock to position 2
150 step, CPU opens A.L.L. door of cassette C2
152 step, CPU thrusts film from cassette C2 to next unexposed frame
154 step, CPU opens A.L.L. door of cassette 1
156 step, CPU thrusts film from cassette C1 to next unexposed frame
158 step, CPU updates display of film cassette status for both chambers
160 step, CPU decision: shutter button partially depressed? Y or N
162 step, CPU waits until shutter button partially depressed
164 step, take subject light reading
166 step, CPU decision: is other chamber empty? Y or N
168 step, CPU decision: is film in gate better choice for exposure without electronic flash? Y or N
170 step, CPU decision: is film in gate is from cassette C1? Y or N
172 step, CPU rewinds film into cassette C1
174 step, CPU closes A.L.L. door of cassette C1
176 step, CPU opens A.L.L. door of cassette C2
177 step, CPU supplies +V pulse to solenoid to flip gear drive train to position 2
178 step, CPU supplies +V pulse to solenoid to flip gear drive train & slit light lock to position 2
180 step, CPU thrusts film from cassette C2 to next unexposed frame
182 step, CPU rewinds film into cassette C2
184 step, CPU closes A.L.L. door of cassette C2
186 step, CPU opens A.L.L. door of cassette C1
187 step, CPU supplies −V pulse to solenoid to flip gear drive train to position 1
188 step, CPU supplies −V pulse to solenoid to flip gear drive train & slit light lock to position 1
190 step, CPU thrusts film from cassette 1 to next unexposed frame
192 step, CPU updates display of film cassette status for both chambers
194 step, go to step 160
196 step, CPU decision: is electronic flash required? Y or N
198 step, CPU exposes film without electronic flash
200 step, CPU activates electronic flash circuitry
202 step, CPU exposes film with electronic flash
204 step, CPU updates frames exposed of currently exposed cassette
206 step, CPU decision: all frames exposed in current cassette? Y or N
208 step, CPU rewinds film into cassette
210 step, CPU closes A.L.L. door
212 step, go to step 102
214 step, CPU advances film to next frame
216 step, CPU updates display of frames exposed of currently exposed cassette
218 step, go to step 160
220 step, CPU unlocks chamber 16 door
222 step, CPU decision: chamber 16 empty? Y or N
224 step, CPU senses cassette has been removed from chamber 16
226 step, CPU resets memory for chamber 16 after being emptied
228 step, CPU decision: sense chamber 16 loaded? Y or N
230 step, chamber 16 door closed without accepting film
232 step, CPU stores in memory that chamber 16 is empty
234 step, CPU determines chamber 16 loaded and locks chamber door
236 step, CPU reads data disk of cassette in chamber 16
238 step, CPU goes to 120
240 step, CPU unlocks chamber 18 door
242 step, CPU decision: chamber 18 empty? Y or N
244 step, CPU senses cassette has been removed from chamber 18
246 step, CPU resets memory for chamber 18 being emptied
248 step, CPU decision: sense chamber 18 loaded? Y or N
250 step, chamber 18 door closed without loading film into chamber 18
252 step, CPU stores in memory that chamber 18 is unloaded
254 step, CPU determines chamber 18 loaded and locks chamber door
256 step, CPU reads data disk of cassette in chamber 18
258 step, CPU goes to step 138
260 step, CPU decision: Is there film in gate from other cassette? Y or N
262 step, CPU rewinds film from gate into other cassette
264 step, CPU closes A.L.L. door of other cassette
266 step, CPU unlocks two-chamber door
267 film presence sensor
268 step, CPU decision: chamber 16 empty? Y or N
269 film presence sensor
270 step, CPU decision: sense cassette in chamber 16 removed? Y or N
272 step, CPU resets memory for chamber 16 being emptied
274 step, CPU stores in memory that cassette in chamber 16 not removed
276 step, CPU decision: chamber 16 loaded? Y or N
278 step, CPU stores in memory that chamber 16 is loaded with new film cassette
280 step, CPU decision: chamber 18 empty? Y or N
282 step, CPU decision: sense cassette in chamber 18 removed? Y or N
284 step, CPU resets memory for chamber 18 being emptied
286 step, CPU stores in memory that cassette in chamber 18 not removed
288 step, CPU decision: chamber 18 loaded? Y or N
290 step, CPU stores in memory that chamber 18 is loaded with new film cassette
292 step, two-chamber door closed
294 step, CPU decision: new film cassette in chamber 16? Y or N
296 step, CPU reads data disk of film cassette in chamber 16
298 step, CPU decision: new film cassette in chamber 18? Y or N 300 step, CPU reads data disk of film cassette in chamber 18
302 step, CPU goes to step 102

What is claimed is:

1. A still picture camera for capturing images on photographic film contained in film cassettes of the type wherein film can be thrust from the cassette and returned to the cassette repeatedly by a camera mechanism, the camera comprising:

(a) a camera body;
   (b) a film gate in the camera body for defining the area of exposure of one frame of film;
   (c) an objective lens mounted on the camera body for forming an image on a film located in the film gate;
   (d) a shutter for controlling the admission of light to the film;
   (e) two film cassette chambers for accepting film cassettes;
   (f) a film drive mechanism for advancing film from or rewinding film into film cassettes located in the chambers, and
   (g) a film spooling chamber for alternately receiving film from either film cassette, whereby the film from the two film cassettes is alternately advanced from either of the two film cassettes past the film gate and into the film spooling chamber for exposure in the film gate.

2. The still picture camera claimed in claim 1, further comprising:

(a) a central processing unit (CPU) for controlling the operation of the camera; and
   (b) wherein film drive mechanism is a movable two-position film drive mechanism, controlled by the CPU, that can be switched between a first position to thrust film from a first film cassette located in a first film cassette chamber and rewind film back into the first film cassette, and a second position to thrust film from a second film cassette located in a second film cassette chamber and rewind film back into the second film cassette.

3. The still picture camera claimed in claim 2, wherein the two film cassette chambers are positioned immediately adjacent each other, and further comprising:

(a) two independently operable film chamber doors respectively structurally aligned with the two adjacent film cassette chambers to provide access to the two film cassette chambers;
   (b) two spool centering pins affixed respectively to said two film chamber doors;
   (c) the two adjacent film cassette chambers and the structurally aligned two film chamber doors being located on a first side of the film gate in the camera body, and
   (d) the film spooling chamber located on a second side of the film gate opposite to said first side.

4. The still picture camera claimed in claim 3 for use with film cassettes of the type having light locks adapted to be driven by light lock drivers, further comprising:

(a) a film perforation sensor located at the film gate for sensing film perforations, the film perforation sensor being connected to the CPU for informing the CPU when a film perforation passes the sensor;
   (b) two film cassette presence sensors located respectively in the cassette chambers and being connected to the CPU for informing the CPU of the presence or absence of a film cassette in the cassette chamber;
   (c) two film cassette data disk readers located respectively in the cassette chambers and being connected to the CPU for informing the CPU of film cassette ISO film speed and number of available exposures in the cassette;
   (d) two film chamber door open/closed sensors for informing the CPU of door operation;
   (e) two film chamber door locks for respectively locking and unlocking the two film chamber doors under control of the CPU;
   (f) two film cassette light lock drivers; and
   (g) means in the CPU for controlling the film chamber door lock and film cassette light lock drivers in response to inputs received from the film perforation sensor, the film cassette presence sensors, the film cassette data disk readers, and the film chamber door open/closed sensors.

5. The still picture camera claimed in claim 4, wherein the camera body defines two film channels, with a first end of each film channel respectively and structurally aligned with the film cassette chambers to accept the discharge of film from a film cassette in a chamber and with the second ends of the film channels converging to a common film channel that guides the discharged film to the film gate, and further comprising: a light lock located at the convergence of the two film channels and moveable between a first position wherein film may be transported through a first one of the two film channels from a first one of the two cassette chambers to the film gate, and a second one of the film channels is sealed from light; and a second position, wherein film may be transported through the second one of the film channels leading from the second cassette chamber and the first film channel is sealed from light.

6. The still picture camera claimed in claim 1, further comprising an electronic flash lamp connected to the CPU for automatic control.

7. The still picture camera claimed in claim 6 wherein the CPU is programmed to automatically change film according to either or all of the criteria of film availability, lighting conditions, choice of electronic flash, and a user programmed priority.

8. The still picture camera claimed in claim 6 wherein the CPU is programmed to operate the camera and select film from either of two film chambers with a priority of minimum use of electronic flash.

9. The still picture camera claimed in claim 6 wherein the CPU is programmed to operate the camera and select film from either of two film chambers with a priority of minimal film changes with use of electronic flash as an option.

10. The still picture camera claimed in claim 6 wherein the CPU is programmed to operate the camera and select film from either of two film chambers with a priority of obtaining better image quality without electronic flash.

11. The still picture camera claimed in claim 6 wherein the CPU is programmed to operate the camera and select film from either of two film chambers with a priority of obtaining better image quality with electronic flash as an option.

12. The still picture camera claimed in claim 2, further comprising a visual display connected to the CPU for displaying the operating status of the camera.

13. The still picture camera claimed in claim 5, wherein the light lock comprises a cylinder defining a slit parallel to the axis of the cylinder for forming a film passage and two ribs forming light baffles protruding respectively from both sides of the film passage.

14. The still picture camera claimed in claim 3, the camera further comprising:

(a) a single film chamber door respectively and structurally aligned with said two adjacent film cassette chambers to provide access to the two film cassette chambers having two spool centering pins affixed thereto;

(b) the two adjacent film cassette chambers and the structurally aligned film chamber door being disposed to a first side of the film gate in the camera body, and the film spooling chamber being disposed to a second side of the film gate opposite to said first side.

15. The still picture camera claimed in claim 14 for use with film cassettes of the type having light locks adapted to be driven by light lock drivers, further comprising:

(a) a film perforation sensor located at the film gate for sensing film perforations, the film perforation sensor being connected to the CPU for informing the CPU when a film perforation passes the sensor;

(b) two film cassette presence sensors located respectively in the cassette chambers and being connected to the CPU for informing the CPU of the presence or absence of a film cassette in the cassette chamber;

(c) two film cassette data disk readers located respectively in the cassette chambers and being connected to the CPU for informing the CPU of film cassette ISO film speed and number of available exposures in the cassette;

(d) a film chamber door open/closed sensor for informing the CPU of door operation;

(e) a film chamber door lock for respectively locking and unlocking the film chamber door under control of the CPU;

(f) two film cassette light lock drivers; and (g) means in the CPU for controlling the film chamber door lock and film cassette light lock drivers in response to inputs received from the film perforation sensor, the film cassette presence sensors, the film cassette data disk readers, and the door open closed sensor.

16. The still picture camera claimed in claim 14, wherein the camera body defines two film channels, with a first end of each film channel respectively and structurally aligned with the film cassette chambers to accept the discharge of film from a film cassette in a chamber and with the second ends of the film channels converging to a common film channel that guides the discharged film to the film gate, and further comprising: a light lock located at the convergence of the two film channels and moveable between a first position wherein film may be transported through a first one of the two film channels from a first one of the two cassette chambers to the film gate, and a second one of the film channels is sealed from light; and a second position, wherein film may be transported through the second one of the film channels leading from the second cassette chamber and the first film channel is sealed from light.

17. The still picture camera claimed in claim 14, further comprising an electronic flash lamp connected to the CPU for automatic control.

18. The still picture camera claimed in claim 17 wherein the CPU is programmed to automatically change film according to either or all of the criteria of film availability, lighting conditions, choice of electronic flash, and a user programmed priority.

19. The still picture camera claimed in claim 17 wherein the CPU is programmed to operate the camera and select film from either of two film chambers with a priority of minimum use of electronic flash.

20. The still picture camera claimed in claim 17 wherein the CPU is programmed to operate the camera and select film from either of two film chambers with a priority of minimal film changes with use of electronic flash as an option.

21. The still picture camera claimed in claim 17 wherein the CPU is programmed to operate the camera and select film from either of two film chambers with a priority of obtaining better image quality without electronic flash.

22. The still picture camera claimed in claim 17 wherein the CPU is programmed to operate the camera and select film from either of two film chambers with a priority of obtaining better image quality with electronic flash as an option.

23. The still picture camera claimed in claim 14, further comprising a visual display connected to the CPU for displaying the operating status of the camera.

24. A method for capturing still picture images on photographic film from two film cassettes of the type wherein film can be thrust from the cassette and returned to the cassette repeatedly by a camera mechanism, the method comprising the steps of:

(a) providing a camera body;

(b) providing a film gate in the camera body for defining the area of exposure of one frame of film;

(c) providing an objective lens mounted on the camera body for forming an image on a film located in the film gate;

(d) providing a shutter for controlling the admission of light to the film;

(e) providing two film cassette chambers for accepting film cassettes;

(f) providing a film drive mechanism for advancing film from or rewinding film into film cassettes located in the chambers, and (g) providing a film spooling chamber for alternately receiving film from either film cassette; and (h) alternately advancing film from either of the two film cassettes past the film gate and into the film spooling chamber for exposure in the film gate.

25. The method claimed in claim 24, further comprising the steps of:

(a) providing a central processing unit (CPU) for controlling the operation of the camera; and (b) controlling the film drive mechanism by the CPU to move between two-positions, a first position to thrust film from a first film cassette located in a first film cassette chamber and rewind film back into the first film cassette, and a second position to thrust film from a second film cassette located in a second film cassette chamber and rewind film back into the second film cassette.

26. The method claimed in claim 25, further comprising the steps of:

(a) providing an electronic flash lamp connected to the CPU; and (b) controlling the electronic flash lamp with the CPU.

27. The method claimed in claim 26, wherein the CPU is programmed to automatically change film according to either or all of the criteria of film availability, lighting conditions, choice of electronic flash, and a user programmed priority.

28. The method claimed in claim 26, wherein the CPU is programmed to operate the camera and select film from either of two film chambers with a priority of minimum use of electronic flash.

29. The method claimed in claim 26, wherein the CPU is programmed to operate the camera and select film from either of two film chambers with a priority of minimal film changes with use of electronic flash as an option.

30. The method claimed in claim 26, wherein the CPU is programmed to operate the camera and select film from either of two film chambers with a priority of obtaining better image quality without electronic flash.

31. The method claimed in claim 26, wherein the CPU is programmed to operate the camera and select film from either of two film chambers with a priority of obtaining better image quality with electronic flash as an option.

32. The method claimed in claim 22, further comprising the step of:

(a) providing a visual display connected to the CPU; and (b) controlling the display with the CPU to display the operating status of the camera.

33. The still picture camera claimed in claim 4, wherein the CPU is programmed to count the perforations of film from each cassette and keep track of where to position the film from the cassettes in the camera in the gate such that no frames are double exposed or unexposed.

34. The method claimed in claim 15, further comprising the step of counting the film frames in the CPU from each cassette that pass the perforation detector and keeping track of when to position the film from the cassettes in the camera at the film gate such that no frames are double exposed or unexposed.

* * * * *